(12) United States Patent
Akiyama

(10) Patent No.: US 11,543,743 B2
(45) Date of Patent: *Jan. 3, 2023

(54) LIGHT SOURCE APPARATUS AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,005

(22) Filed: Sep. 16, 2021

(65) Prior Publication Data

US 2022/0082921 A1    Mar. 17, 2022

(30) Foreign Application Priority Data

Sep. 17, 2020  (JP) .............................. JP2020-156174

(51) Int. Cl.

| G03B 21/20 | (2006.01) |
|---|---|
| G02B 5/30 | (2006.01) |
| G02B 27/28 | (2006.01) |
| G02F 1/1335 | (2006.01) |
| H04N 9/31 | (2006.01) |

(Continued)

(52) U.S. Cl.
CPC ....... *G03B 21/2073* (2013.01); *G02B 5/3083* (2013.01); *G02B 27/283* (2013.01); *G02F 1/13362* (2013.01); *G02F 1/133526* (2013.01); *G03B 21/204* (2013.01); *G03B 21/208* (2013.01); *G03B 21/2013* (2013.01); *G03B 21/2066* (2013.01); *G03B 33/12* (2013.01); *H04N 9/3161* (2013.01); *H04N 9/3164* (2013.01)

(58) Field of Classification Search
CPC ............ G03B 21/2073; G03B 21/2013; G03B 21/204; G03B 21/2066; G03B 21/208; H04N 9/3161; H04N 9/3164
USPC .......................................................... 353/56
See application file for complete search history.

(56) References Cited

U.S. PATENT DOCUMENTS

| 5,161,042 A | 11/1992 | Hamada |
|---|---|---|
| 10,444,611 B2 | 10/2019 | Pan et al. |

(Continued)

FOREIGN PATENT DOCUMENTS

| JP | H04-060538 A | 2/1992 |
|---|---|---|
| JP | 2005-321502 A | 11/2005 |

(Continued)

*Primary Examiner* — Jerry L Brooks
(74) *Attorney, Agent, or Firm* — Oliff PLC

(57) ABSTRACT

A light source apparatus includes a light source section, a first optical layer that transmits first light polarized in a first polarization direction and incident from the light source section and reflects the first light polarized in a second polarization direction and incident from the light source section, a second optical layer that transmits the first light polarized in the first polarization direction and incident from the first optical layer, a third optical layer that transmits the first light polarized in the first polarization direction and incident from the second optical layer, a fourth optical layer that reflects the first light polarized in the first polarization direction and incident from the third optical layer, a diffusion element, and a wavelength converter.

13 Claims, 10 Drawing Sheets

(51) Int. Cl.
   *G02F 1/13357*   (2006.01)
   *G03B 33/12*    (2006.01)

(56)          References Cited

U.S. PATENT DOCUMENTS 10,915,014 B1   2/2021  Akiyama
 2005/0248736 A1  11/2005  Itoh
 2008/0062386 A1   3/2008  Ito
 2013/0027670 A1   1/2013  Akiyama et al.
 2020/0201155 A1   6/2020  Akiyama
 2020/0249555 A1   8/2020  Akiyama
 2020/0252589 A1   8/2020  Akiyama
 2020/0314397 A1  10/2020  Akiyama
 2022/0082916 A1*  3/2022  Akiyama ............. G02B 5/3083

FOREIGN PATENT DOCUMENTS

JP       2008-065250 A    3/2008
 JP       2013-167812 A    8/2013
 JP       2014-106453 A    6/2014
 JP       2014-182206 A    9/2014
 JP       2015-060035 A    3/2015
 JP       2019-053241 A    4/2019
 JP       2020-034821 A    3/2020
 JP       2020-101711 A    7/2020
 JP       2020-106692 A    7/2020
 JP       2020-126089 A    8/2020
 JP       2020-126170 A    8/2020
 JP       2020-160236 A   10/2020
 JP       2021-033165 A    3/2021

* cited by examiner

LIGHT SOURCE APPARATUS AND PROJECTOR

The present application is based on, and claims priority from JP Application Serial Number 2020-156174, filed Sep. 17, 2020, the disclosure of which is hereby incorporated by reference herein in its entirety.

BACKGROUND

1. Technical Field

The present disclosure relates to a light source apparatus and a projector.

2. Related Art

There is a known projector that modulates the light outputted from a light source to generate image light based on image information and projects the generated image light. JP-A-4-60538 discloses a projection-type color image display apparatus including a light source, a plurality of dichroic mirrors, a liquid crystal display device including a microlens array, and a projection lens. The projection-type color image display apparatus separates white light outputted from the light source into a plurality of color luminous fluxes different in color from one another and performs color display operation by causing the plurality of separated color luminous fluxes to be incident on different sub-pixels in the single liquid crystal display device.

In the projection-type color image display apparatus described above, a red light reflecting dichroic mirror, a green light reflecting dichroic mirror, and a blue light reflecting dichroic mirror are so arranged as to be nonparallel to one another along the optical axis along which the white light outputted from the light source is incident. The white light outputted from the light source passes through the dichroic mirrors described above, which separate the white light into red light, green light, and blue light that travel in directions different from one another. The red light, the green light, and the blue light are incident on red sub-pixels, green sub-pixels, and blue sub-pixels of a light modulation device, respectively, with the red light, the green light, and the blue light spatially separated by the microlenses provided on the light incident side of the light modulation device.

In the projection-type color image display apparatus disclosed in JP-A-4-60538, a lamp light source, such as a halogen lamp or a xenon lamp, is used as the white light source, and the liquid crystal display device is used as the light modulation device. The light outputted from the lamp light source is unpolarized light, and when the liquid crystal display device is used as the light modulation device, the light incident on the liquid crystal display device needs to be linearly polarized light polarized in a specific direction. In contrast, to uniformly illuminate the liquid crystal display device, it is conceivable to provide, between the white light source and the liquid crystal display device, a pair of multi-lens arrays that divide the light incident thereon into a plurality of sub-luminous fluxes and a polarization converter that aligns the polarization directions of the plurality of sub-luminous fluxes with one another. In this case, a polarization converter including the following sections is used in many cases: a plurality of polarization separation layers and a plurality of reflection layers alternately arranged along the direction intersecting the light incident direction and a retardation layer provided in the optical path of the light having passed through the polarization separation layers or the optical path of the light reflected off the reflection layers.

However, when the size of the projection-type color image display apparatus described above is reduced to meet the recent demand for size reduction, it is difficult to manufacture a polarization converter formed of the polarization separation layers and the reflection layers arranged at small intervals. It is therefore difficult to reduce the size of a light source apparatus including a polarization converter of this type and in turn the size of a projector including the light source apparatus. In view of the problems described above, there is a need to provide a light source apparatus capable of outputting a plurality of color luminous fluxes polarized in an aligned direction without use of a small-interval polarization converter.

SUMMARY

To solve the problems described above, a light source apparatus according to an aspect of the present disclosure includes a light source section that outputs first light having a first wavelength band and containing light polarized in a first polarization direction and light polarized in a second polarization direction different from the first polarization direction, a first optical layer that transmits in a first direction the first light polarized in the first polarization direction and reflects in a second direction that intersects the first direction the first light polarized in the second polarization direction, the first light incident from the light source section along the first direction, a second optical layer that is disposed in a position shifted in the first direction from the first optical layer and transmits in the first direction the first light polarized in the first polarization direction and incident from the first optical layer along the first direction, a third optical layer that is disposed in a position shifted in the first direction from the second optical layer and transmits in the first direction the first light polarized in the first polarization direction and incident from the second optical layer along the first direction, a fourth optical layer that is disposed in a position shifted in the first direction from the third optical layer and reflects in the second direction the first light polarized in the first polarization direction and incident from the third optical layer along the first direction, a diffusion element that is disposed in a position shifted in the second direction from the first optical layer, diffuses the first light incident from the first optical layer along the second direction, and outputs the diffused first light in a third direction opposite the second direction, and a wavelength converter that is disposed in a position shifted in the second direction from the third optical layer, converts in terms of wavelength the first light polarized in the first polarization direction and incident from the fourth optical layer along the second direction, and outputs in the third direction second light having a second wavelength band different from the first wavelength band. The third optical layer receives the second light from the wavelength converter along the third direction, transmits in the third direction the second light polarized in the first polarization direction, and reflects in a fourth direction opposite the first direction the second light polarized in the second polarization direction. The fourth optical layer receives the second light polarized in the first polarization direction and incident from the wavelength converter along the third direction and transmits in the third direction the second light polarized in the first polarization direction. The second optical layer receives the second light polarized in the second polarization direction and incident from the third optical layer along the fourth direction and reflects in the third direction the second light polarized in the second polarization direction. The first optical layer receives the first light outputted from the diffusion element along the third direction and transmits in the third direction the first light incident on the first optical layer. The second optical layer receives the first light that exits out of the first optical layer along the third direction and transmits in the third direction the first light incident on the second optical layer.

A projector according to another aspect of the present disclosure includes the light source apparatus according to the aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 9.

Figure 1:
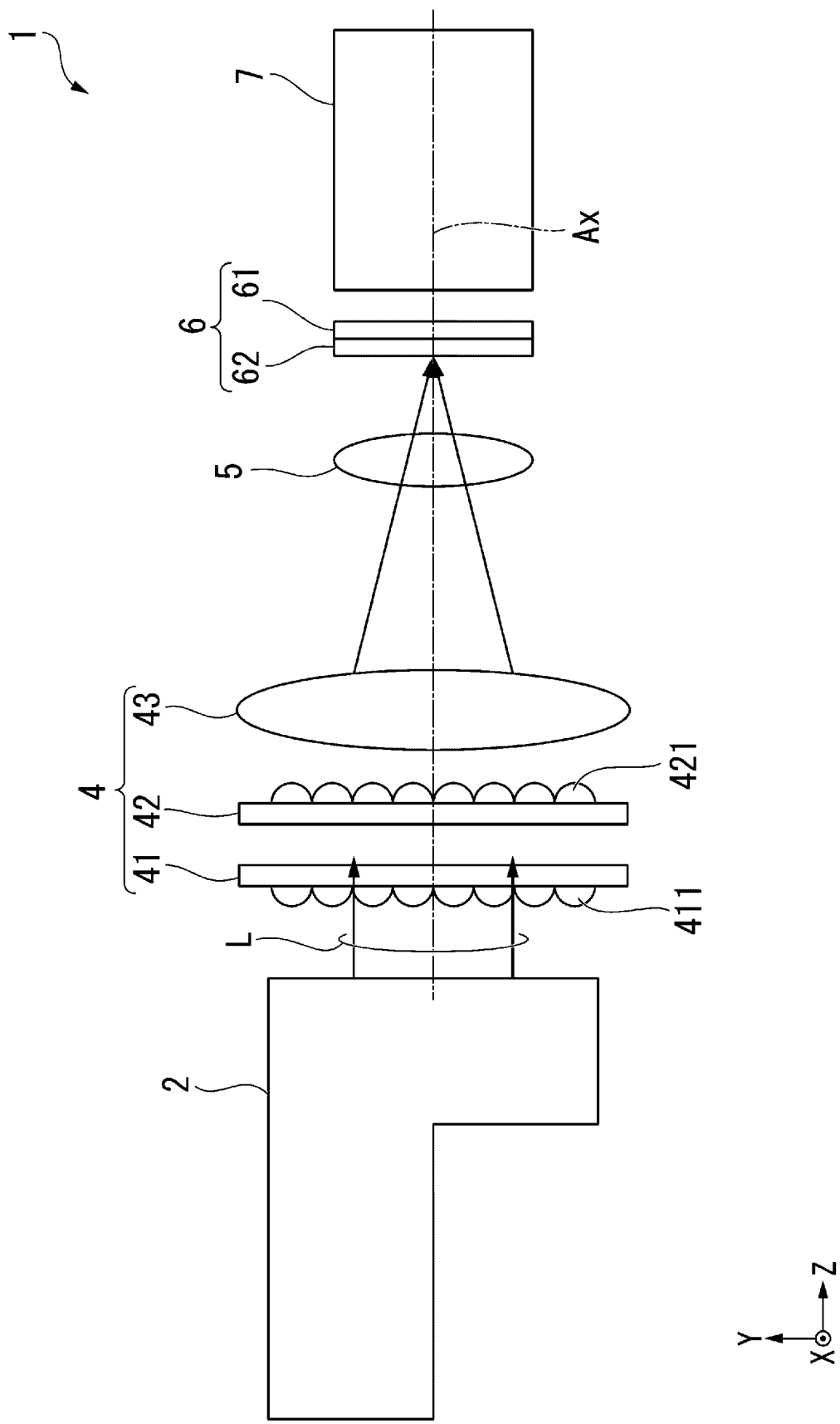
FIG. 1 is a schematic configuration diagram of a projector according to a first embodiment.

FIG. 1 is a schematic configuration diagram of a projector 1 according to the present embodiment.

In the following drawings, components are drawn at different dimensional scales in some cases for clarification of each of the components.

The projector 1 according to the present embodiment modulates light outputted from a light source apparatus 2 to form an image according to image information and enlarges and projects the formed image on a projection receiving surface, such as a screen. In other words, the projector 1 modulates the light outputted from the light source apparatus 2 by using a single light modulator 6 including a single liquid crystal panel 61 to form an image and projects the formed image. The projector 1 is what is called a single-panel projector.

The projector 1 includes the light source apparatus 2, a homogenizer 4, a field lens 5, the light modulator 6, and a projection optical apparatus 7, as shown in FIG. 1. The light source apparatus 2, the homogenizer 4, the field lens 5, the light modulator 6, and the projection optical apparatus 7 are arranged in predetermined positions along an illumination optical axis Ax. The illumination optical axis Ax is defined as an axis extending along the traveling direction of the chief beam of light L outputted from the light source apparatus 2.

The configurations of the light source apparatus 2 and the homogenizer 4 will be described later in detail.

The field lens 5 is disposed between the homogenizer 4 and the light modulator 6. The field lens 5 parallelizes the light L having exited out of the homogenizer 4 and guides the parallelized light L to the light modulator 6.

The projection optical apparatus 7 projects the light modulated by the light modulator 6, that is, image forming light onto the projection receiving surface (not shown), such as a screen. The projection optical apparatus 7 includes a single projection lens or a plurality of projection lenses.

In the following description, an axis parallel to the traveling direction of the light outputted from the light source apparatus 2 along the illumination optical axis Ax is called an axis Z, and the light traveling direction is called a direction +Z. Two axes that are perpendicular to the axis Z and to each other are called an axis X and an axis Y. Out of the directions along the axes X and Y, the direction toward the upper side of the vertical direction in the space where the projector 1 is installed is called a direction +Y. The direction toward the right side of the horizontal direction is called a direction +X when a target object on which light is incident along the direction +Z is so viewed that the direction +Y is oriented toward the upper side of the vertical direction. Although not shown, the direction opposite the direction +X is a direction −X, the direction opposite the direction +Y is a direction −Y, and the direction opposite the direction +Z is a direction −Z.

The direction +X in the present embodiment corresponds to the first direction in the appended claims. The direction −Z in the present embodiment corresponds to the second direction in the appended claims. The direction +Z in the present embodiment corresponds to the third direction in the appended claims. The direction −X in the present embodiment corresponds to the fourth direction in the appended claims. The direction +Y in the present embodiment corresponds to the fifth direction in the appended claims. The direction −Y in the present embodiment corresponds to the sixth direction in the appended claims.

Configuration of Light Source Apparatus

Figure 2:
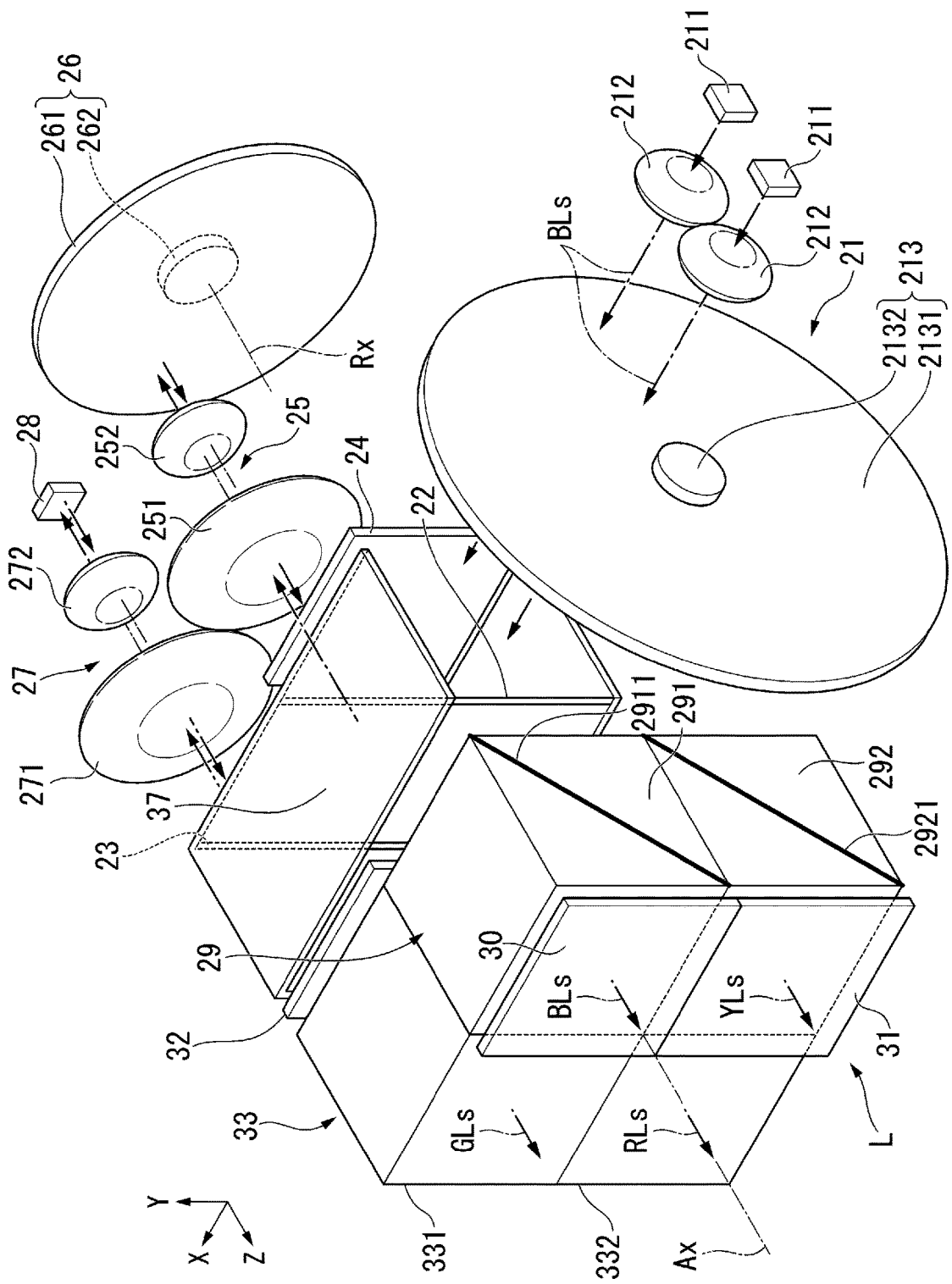
FIG. 2 is a perspective view of a light source apparatus according to the first embodiment.
Figure 3:
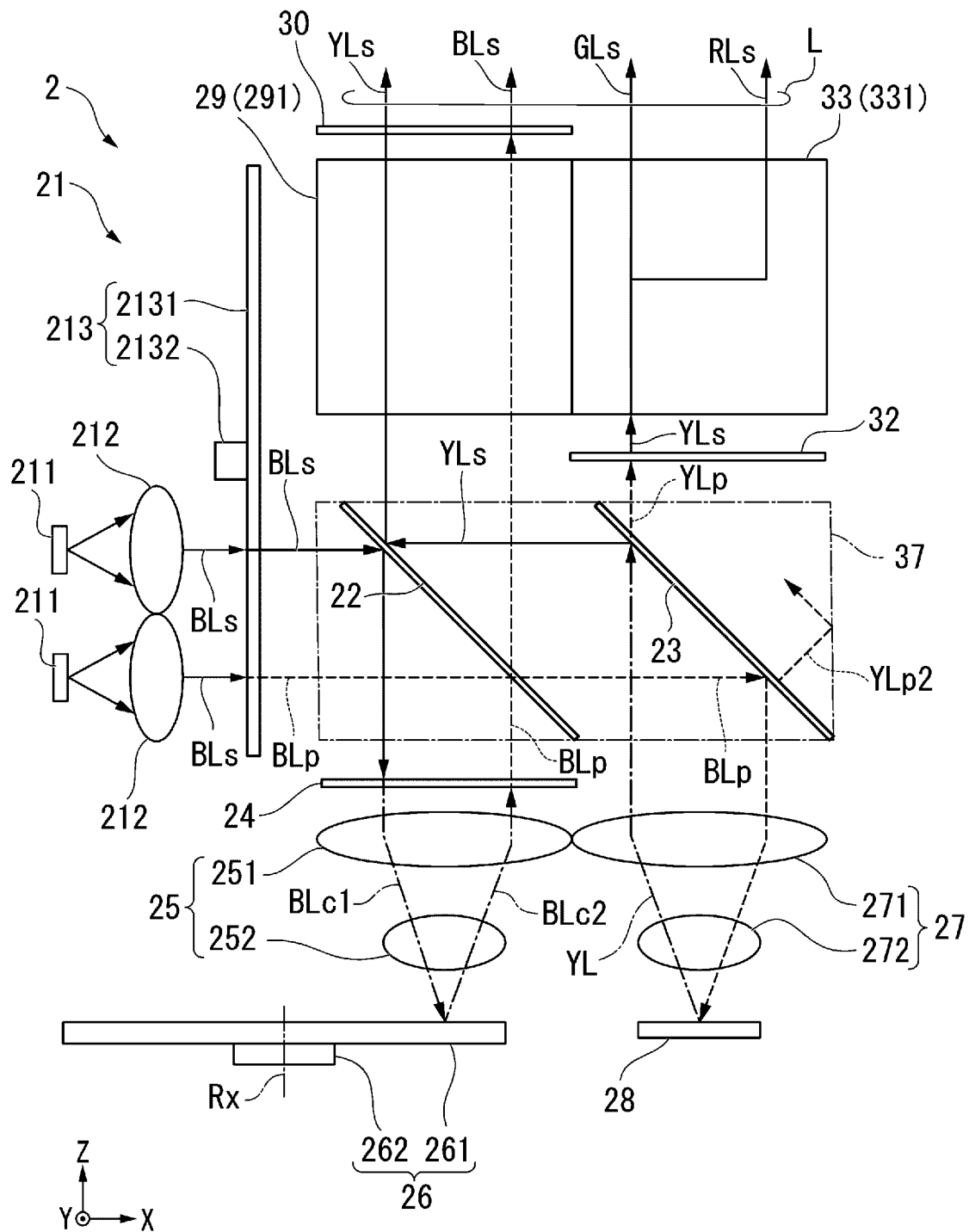
FIG. 3 is a plan view of the light source apparatus viewed in a direction +Y.

FIG. 2 is a perspective view of the light source apparatus 2 according to the present embodiment. FIG. 3 is a plan view of the light source apparatus 2 viewed in the direction +Y.

The light source apparatus 2 outputs the light L, which illuminates the light modulator 6, in the direction parallel to the illumination optical axis Ax, that is, direction +Z, as shown in FIGS. 2 and 3. The light L outputted by the light source apparatus 2 is linearly polarized light having an aligned polarization direction and contains a plurality of spatially separated color luminous fluxes. In the present embodiment, the light L outputted by the light source apparatus 2 is formed of four luminous fluxes each formed of S-polarized light. The four luminous fluxes are blue light BLs, yellow light YLs, green light GLs, and red light RLs.

The light source apparatus 2 includes a light source section 21, a first optical element 22, a second optical element 23, a light tunnel 37, a first retardation element 24, a first light collector 25, a diffuser 26, a second light collector 27, a wavelength converter 28, a first color separator 29, a fourth retardation element 30, a reflector 31, a third retardation element 32, and a second color separator 33.

P-polarized light in the present embodiment corresponds to the light polarized in a first polarization direction in the appended claims. S-polarized light in the present embodiment corresponds to the light polarized in a second polarization direction in the appended claims. As will be described later, the first optical element 22 and the second optical element 23 differ from the first color separator 29 and the second color separator 33 in terms of orientation of a polarization component separation film or a color luminous flux separation film. The notation "P-polarized light" and "S-polarized light" is therefore expressed in terms of polarization direction with respect to the first optical element 22 and the second optical element 23, and the notation is reversed for the first color separator 29 and the second color separator 33. That is, the P polarized light with respect to the first optical element 22 and the second optical element 23 is the S polarized light with respect to the first color separator 29 and the second color separator 33, and the S polarized light with respect to the first optical element 22 and the second optical element 23 is the P polarized light with respect to the first color separator 29 and the second color separator 33. However, noted that changing the name of the same type of polarized light in accordance with an element on which the polarized light is incident may cause confusion in the description. Therefore, the name of polarized light is not changed in accordance with an element on which the polarized light is incident, and the P-polarized light and S-polarized light are hereinafter used as the polarization directions with respect to the first optical element 22 and the second optical element 23.

In the drawings, the P-polarized light is drawn with a broken arrow, the S-polarized light is drawn with a solid arrow, and polarized light other than the P-polarized light and S-polarized light is drawn with a dashed arrow.

Configuration of Light Source Section

The light source section 21 outputs the blue light BLs to be incident on the first optical element 22 along the direction +X. The light source section 21 includes a plurality of light emitters 211, a plurality of collimator lenses 212, and a rotary retarder 213. The light emitters 211 are each formed of a solid-state light source that outputs the blue light BLs. Specifically, the light emitters 211 are each formed of a semiconductor laser that outputs S-polarized blue light BLs. The blue light BLs is, for example, laser light having a blue wavelength band ranging from 440 to 480 nm and a peak wavelength in the range, for example, from 450 to 460 nm. That is, the light source section 21 outputs the blue light BLs having the blue wavelength band.

In the present embodiment, the plurality of light emitters 211 are arranged along the axis Z. The light source section 21 in the present embodiment includes two light emitters 211, but the number of light emitters 211 is not limited to a specific number and may be one. Furthermore, the arrangement of the plurality of light emitters 211 is also not limited to a specific arrangement. The light emitters 211 are so arranged as to output the S-polarized blue light BLs but may instead be so arranged as to output P-polarized blue light, because the rotary retarder 213 can arbitrarily set the ratio between the amount of S-polarized light and the amount of P-polarized light. That is, the light emitters 211 may each be rotated by 90° around the light exiting optical axis of the light emitter 211.

The blue light BLs having the blue wavelength band in the present embodiment corresponds to the first light having a first wavelength band in the appended claims.

The plurality of collimator lenses 212 are provided between the plurality of light emitters 211 and the rotary retarder 213. The collimator lenses 212 are provided in correspondence with the respective light emitters 211. The collimator lenses 212 collimate the light BLs outputted from the respective light emitters 211.

The rotary retarder 213 includes a second retardation element 2131 and a rotator 2132. The second retardation element 2131 is rotatable around an axis of rotation along the traveling direction of the light incident on the second retardation element 2131, that is, an axis of rotation parallel to the axis X. The rotator 2132 is formed, for example, of a motor and rotates the second retardation element 2131.

The second retardation element 2131 is formed of a half-wave plate or a quarter-wave plate for the blue wavelength band. Part of the S-polarized blue light BLs incident on the second retardation element 2131 is converted by the second retardation element 2131 into P-polarized blue light BLp. The blue light having passed through the second retardation element 2131 is therefore the mixture of the S-polarized blue light BLs and the P-polarized blue light BLp mixed at a predetermined ratio. That is, the second retardation element 2131 receives the blue light BLs outputted from the light emitters 211 and outputs blue light containing the S-polarized blue light BLs and the P-polarized blue light BLp.

The rotator 2131 adjusts the angle of rotation of the second retardation element 2131 to adjust the ratio between the amount of S-polarized blue light BLs and the amount of P-polarized blue light BLp contained in the light that passes through the second retardation element 2131. When there is no need to adjust the ratio between the amount of blue light BLs and the amount of blue light BLp, the rotator 2132, which rotates the second retardation element 2131, may not be provided. In this case, the angle of rotation of the second retardation element 2131 is so set that the ratio between the amount of blue light BLs and the amount of blue light BLp is a ratio set in advance, and the rotational position of the second retardation element 2131 is then fixed.

The light source section 21 thus outputs the light containing the S-polarized blue light BLs and the P-polarized blue light BLp. In the present embodiment, the plurality of light emitters 211 are all configured to output the S-polarized blue light BLs, and the light source section 21 may be a mixture of light emitters 211 that output the S-polarized blue light BLs and light emitters 211 that output the P-polarized blue light BLp. According to the configuration described above, the rotary retarder 213 can be omitted. The light emitters 211 are each not necessarily formed of a semiconductor laser and may instead each be formed of any other solid-state light source, such as an LED (light emitting diode).

Configuration of First Optical Element

The first optical element 22 is disposed in a position shifted in the direction +X from the light source section 21. The blue light containing the P-polarized blue light BLp and the S-polarized blue light BLs is incident on the first optical element 22 from the light source section 21 along the direction +X. S-polarized yellow light YLs is also incident on the first optical element 22 from the second optical element 23 along the direction −X, as will be described later. The first optical element 22 is formed of an optical element formed of a single plate on which an optical film is provided, what is called a plate-shaped optical element.

Figure 4:
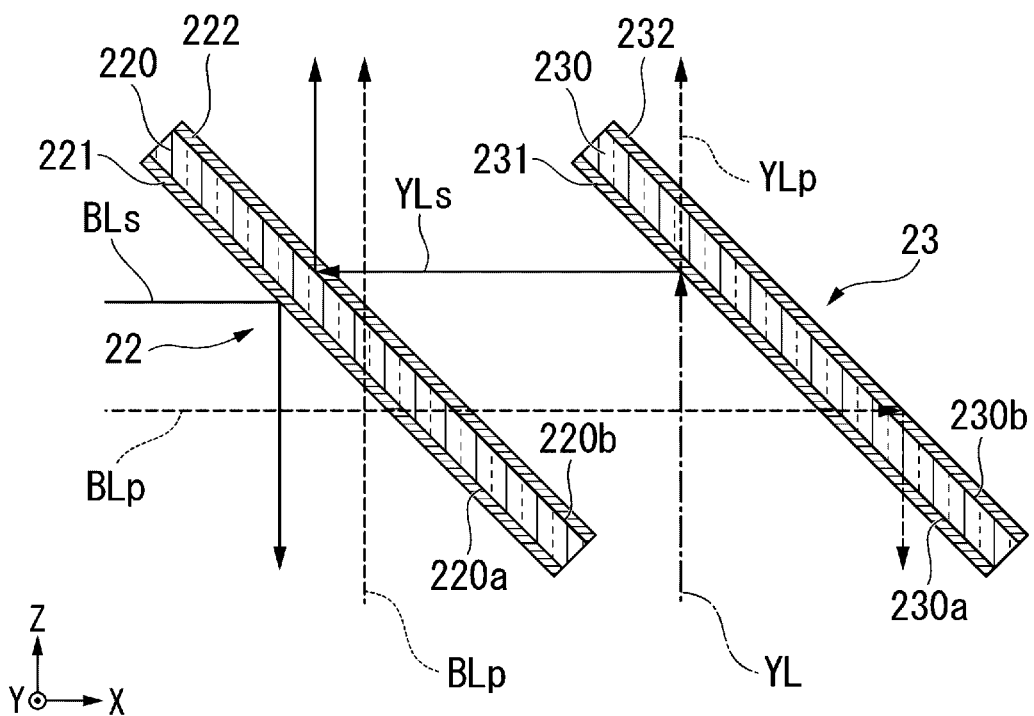
FIG. 4 shows a detailed configuration of a first optical element and the second optical element.

FIG. 4 shows a detailed configuration of the first optical element 22 and the second optical element 23.

The first optical element 22 includes a first light-transmissive base 220, a first optical layer 221, and a second optical layer 222, as shown in FIG. 4.

The first light-transmissive base 220 is disposed in a position shifted in the direction +X from the light source section 21. The first light-transmissive base 220 has a first surface 220a facing the light source section 21 and a second surface 220b different from the first surface 220a. The first surface 220a and the second surface 220b face each other. The first light-transmissive base 220 is made, for example, of typical optical glass.

The first optical layer 221 is provided at the first surface 220a of the first light-transmissive base 220. The first optical layer 221 is disposed in a position shifted in the direction +X from the light source section 21. The first optical layer 221 transmits the P-polarized light and reflects the S-polarized light out of the light having the blue wavelength band. That is, the first optical layer 221 has a polarization separation characteristic for the light having the blue wavelength band. The first optical layer 221 therefore transmits the P-polarized blue light BLp in the direction +X and reflects the S-polarized blue light BLs in the direction −Z, which intersects the direction +X, out of the blue light BLp and BLs incident from the light source section 21 along the direction +X. The first optical layer 221 is formed, for example, of a dielectric multilayer film.

The first optical layer 221 only needs to transmit the P-polarized light and reflect the S-polarized light out of the light having the blue wavelength band, as described above, and therefore does not need to have specific characteristics for the light having the wavelength bands other than the blue wavelength band.

The second optical layer 222 is provided at the second surface 220b of the first light-transmissive base 220. The second optical layer 222 is disposed in a position shifted in the direction +X from the first optical layer 221. The second optical layer 222 is characterized in that it transmits the P-polarized light out of the light having the blue wavelength band. The second optical layer 222 therefore transmits in the direction +X the P-polarized blue light BLp incident from the first optical layer 221 along the direction +X. Furthermore, the second optical layer 222 is characterized in that it reflects the S-polarized light out of the light having the wavelength bands other than the blue wavelength band, that is, the wavelength band including a green wavelength band and a red wavelength band. The second optical layer 222 is formed, for example, of a dielectric multilayer film.

The second optical layer 222 only needs to transmit the P-polarized light out of the light having the blue wavelength band, as described above, and may therefore either transmit or reflect the S-polarized light. The second optical layer 222 only needs to reflect the S-polarized light out of the light having the wavelength band including the green wavelength band and the red wavelength band and may therefore either transmit or reflect the P-polarized light. The second optical layer 222 may therefore be characterized in that it transmits the P-polarized light and reflects the S-polarized light in the entire wavelength band in the visible region.

The second optical layer 222 may instead be characterized in that it transmits the P-polarized light and the S-polarized light out of the light having the blue wavelength band and reflects the S-polarized light and the P-polarized light out of the light having the wavelength band including the green wavelength band and the red wavelength band. In other words, the second optical layer 222 may be formed of a dichroic mirror that transmits blue light and reflects yellow light irrespective of the polarization direction of the light incident on the second optical layer 222.

The thus configured first optical element 22 as a whole provides both the functions of the first optical layer 221 and the second optical layer 222. The S-polarized blue light BLs incident along the direction +X is reflected off the first optical layer 221 and is therefore not incident on the second optical layer 222. The S-polarized yellow light YLs incident along the direction −X is reflected off the second optical layer 222 and is therefore not incident on the first optical layer 221. The first optical element 22 is therefore characterized as a whole in that it transmits the P-polarized light and reflects the S-polarized light out of the light having the blue wavelength band and reflects the S-polarized light out of the light having the wavelength band including the green wavelength band and the red wavelength band.

Configuration of Second Optical Element

The second optical element 23 is disposed in a position shifted in the direction +X from the first optical element 22, as shown in FIG. 3. The P-polarized blue light BLp is incident on the second optical element 23 from the first optical element 22 along the direction +X. Unpolarized yellow light YL is further incident on the second optical element 23 from the wavelength converter 28 along the direction +Z. The second optical element 23 is formed of an optical element formed of a single plate on which an optical film is provided, what is called a plate-shaped optical element, as the first optical element 22 is.

The second optical element 23 includes a second light-transmissive base 230, a third optical layer 231, and a fourth optical layer 232, as shown in FIG. 4.

The second light-transmissive base 230 is disposed in a position shifted in the direction +X from the first light-transmissive base 220. The second light-transmissive base 230 has a third surface 230a facing the first light-transmissive base 220 and a fourth surface 230b different from the third surface 230a. The third surface 230a and the fourth surface 230b face each other. The second light-transmissive base 230 is made, for example, of typical optical glass.

The third optical layer 231 is provided at the third surface 230a of the second light-transmissive base material 230. The third optical layer 231 is disposed in a position shifted in the direction +X from the second optical layer 222. The third optical layer 231 transmits the P-polarized light out of the light having the blue wavelength band and transmits the P-polarized light and reflects the S-polarized light out of the light having the wavelength band including the green wavelength band and the red wavelength band. That is, the third optical layer 231 transmits the P-polarized blue light BLp and has polarization separation characteristics for the light having the wavelength band including the green wavelength band and the red wavelength band. The third optical layer 231 therefore transmits in the direction +X the P-polarized blue light BLp incident from the second optical layer 222 along the direction +X. The third optical layer 231 is formed, for example, of a dielectric multilayer film. The third optical layer 231 may be characterized in that it transmits the P-polarized light and reflects the S-polarized light in the entire wavelength band in the visible region.

The fourth optical layer 232 is provided at the fourth surface 230b of the second light-transmissive base 230. The fourth optical layer 232 is disposed in a position shifted in the direction +X from the third optical layer 231. The fourth optical layer 232 is characterized in that it reflects P-polarized light out of the light having the blue wavelength band. The fourth optical layer 232 therefore reflects in the direction −Z the P-polarized blue light BLp incident from the third optical layer 231 along the direction +X. The fourth optical layer 232 is further characterized in that it transmits the P-polarized light in the wavelength band including the green wavelength band and the red wavelength band. The fourth optical layer 232 is formed, for example, of a dielectric multilayer film.

The fourth optical layer 232 only needs to reflect the P-polarized light out of the light having the blue wavelength band, as described above, and may therefore either reflect or transmit the S-polarized light. The fourth optical layer 232 only needs to transmit the P-polarized light out of the light having the wavelength band including the green wavelength band and the red wavelength band and may therefore either transmit or reflect the S-polarized light.

The fourth optical layer 232 may instead be characterized in that it reflects the P-polarized light and the S-polarized light out of the light having the blue wavelength band and transmits the P-polarized light and the S-polarized light out of the light having the wavelength band including the green wavelength band and the red wavelength band. In other words, the fourth optical layer 232 may be formed of a dichroic mirror that reflects blue light and transmits yellow light irrespective of the polarization direction of the light incident on the fourth optical layer 232.

The thus configured second optical element 23 has both the functions of the third optical layer 231 and the fourth optical layer 232. The second optical element 23 is therefore characterized as a whole in that it reflects the P-polarized light out of the light having the blue wavelength band and transmits the P-polarized light and reflects the S-polarized light out of the light having the wavelength band including the green wavelength band and the red wavelength band.

Configuration of Light Tunnel

Figure 5:
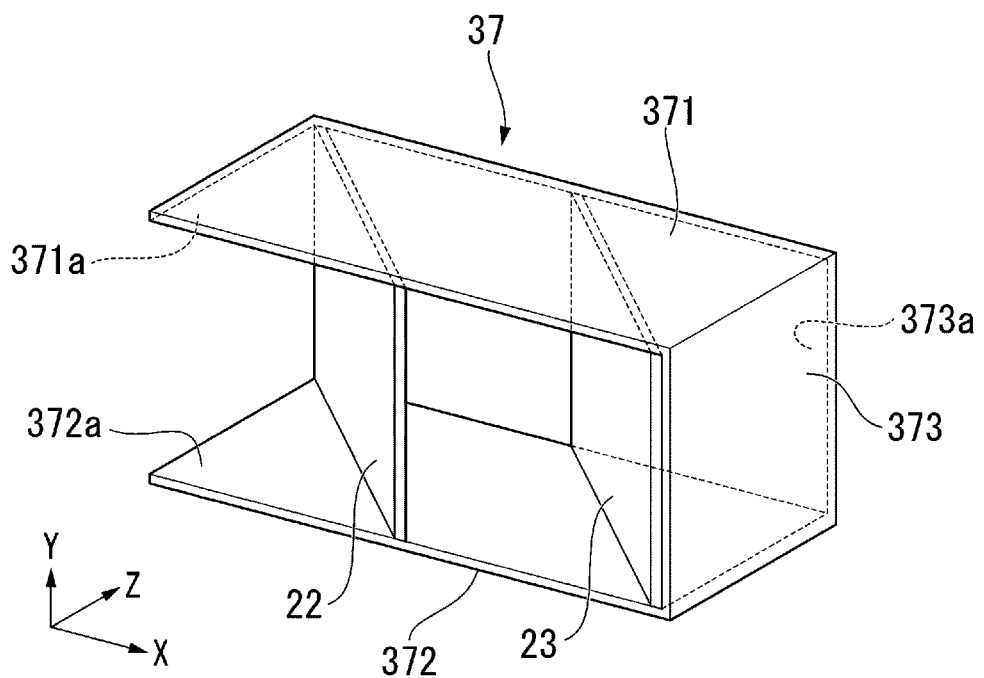
FIG. 5 is a perspective view of a light tunnel.

FIG. 5 is a perspective view of the light tunnel 37.

The light tunnel 37 includes a first reflection member 371, a second reflection member 372, and a third reflection member 373, as shown in FIG. 5.

The first reflection member 371 is disposed in a position shifted in the direction +Y, which intersects the directions +X and −Z from the first light transmissive base 220 of the first optical element 22 and the second light-transmissive base 230 of the second optical element 23. The first reflection member 371 is formed of a plate having at least one light-reflective surface. A surface 371a of the first reflection member 371, which is the surface on the side where the first optical element 22 and the second optical element 23 are disposed, is a reflection surface that reflects light incident on the surface 371a.

The second reflection member 372 is disposed in a position shifted in the direction −Y, which is opposite the direction +Y, from the first light-transmissive base 220 of the first optical element 22 and the second light-transmissive base 230 of the second optical element 23. The second reflection member 372 is formed of the same plate as that of the first reflection member 371. A surface 372a of the second reflection member 372, which is the surface on the side where the first optical element 22 and the second optical element 23 are disposed, is a reflection surface that reflects light incident on the surface 372a. The first reflection member 371 and the second reflection member 372 are arranged along the plane XZ and face each other.

The third reflection member 373 is disposed in a position shifted in the direction +X from the fourth optical layer 232 of the second optical element 23. The third reflection member 373 and the second optical element 23 form an angle of 45°. The third reflection member 373 is formed of a plate having at least one light-reflective surface. A surface 373a of the third reflection member 373, which is the surface on the side where the second optical element 23 is disposed, is a reflection surface that reflects light incident on the surface 373a. The third reflection member 373 is disposed along the plane YZ in an orientation that intersects the first reflection member 371 and the second reflection member 372.

The first reflection member 371, the second reflection member 372, and the third reflection member 373 are bonded to each other, for example, with an adhesive. The first optical element 22 and the second optical element 23 are bonded to the first reflection member 371 and the second reflection member 372, for example, with an adhesive. In the light tunnel 37 formed of the first reflection member 371, the second reflection member 372, and the third reflection member 373, the surfaces 371a, 372a, and 373a facing the first optical element 22 and the second optical element 23 are all reflection surfaces. The thus configured light tunnel 37, which totally reflects the light having exited out of the first optical element 22 and the second optical element 23, has the function of suppressing optical loss. The light tunnel 37 also functions as a support member that supports the first optical element 22 and the second optical element 23.

The light tunnel 37 can be produced, for example, by arranging a plurality of block gauges in a row along the axis X, the block gauges each having a diamond planar shape with one apex having an angle of 45°, sequentially joining the first reflection member 371 and the second reflection member 372 to the first optical element 22 and the second optical element 23 with the first optical element 22 and the second optical element 23 sandwiched between the adjacent block gauges, and joining the third reflection member 373 to the first reflection member 371 and the second reflection member 372.

The light tunnel 37 may not necessarily have the configuration in which three plates are joined to each other as in the present embodiment and may have a configuration in which at least two plates are integrated with each other.

Configuration of First Retardation Element

The first retardation element 24 is disposed in a position shifted in the direction −Z from the first optical element 22. That is, the first retardation element 24 is disposed in the axis Z between the first optical layer 221 of the first optical element 22 and a diffuser plate 261. The first retardation element 24 is formed of a quarter-wave plate for the blue wavelength band of the blue light BLs incident on the first retardation element 24. The S-polarized blue light BLs reflected off the first optical element 22 is converted by the first retardation element 24 into, for example, right-handed circularly polarized blue light BLc1, which then exits toward the first light collector 25. That is, the first retardation element 24 converts the polarization state of the blue light BLs incident from the first optical layer 221 along the direction −Z on the first retardation element 24.

Configuration of First Light Collector

The first light collector 25 is disposed in a position shifted in the direction −Z from the first retardation element 24. That is, the first light collector 25 is disposed in the axis Z between the first retardation element 24 and the diffuser plate 261. The first light collector 25 focuses the blue light BLc1 incident from the first retardation element 24 along the direction −Z on the diffuser plate 261. Furthermore, the first light collector 25 parallelizes blue light BLc2, which will be described later and is incident from the diffuser plate 261 along the direction +Z. In the example shown in FIG. 3, the first light collector 25 is formed of a first lens 251 and a second lens 252, but the number of lenses that form the first light collector 25 is not limited to a specific number.

Configuration of Diffuser

The diffuser 26 is disposed in a position shifted in the direction −Z from the first light collector 25. That is, the diffuser 26 is disposed in a position shifted in the direction −Z from the first optical layer 221 of the first optical element 22. The diffuser 26 diffuses the blue light BLc1 incident from the first optical layer 221 along the direction −Z in such a way that the angle of diffusion of the diffused blue light BLc1 is comparable to that of the yellow light YL emitted from the wavelength converter 28 and outputs the diffused blue light BLc1 in the direction +Z, which is opposite the direction −Z. The diffuser 26 includes the diffuser plate 261 and a rotator 262. The diffuser plate 261 preferably has reflection characteristics that achieve closest possible Lambertian scattering and reflects the blue light BLc1 incident on the diffuser plate 261 at a wide angle. The rotator 262 is formed, for example, of a motor and rotates the diffuser plate 261 around an axis of rotation Rx, which is parallel to the direction +Z.

The diffuser plate 261 in the present embodiment corresponds to the diffusion element in the appended claims.

The blue light BLc1 incident on the diffuser plate 261 is reflected off the diffuser plate 261 and converted into the blue light BLc2, which is circularly polarized light having a polarization rotation direction opposite the polarization rotation direction of the blue light BLc1 before the conversion. That is, the right-handed circularly polarized blue light BLc1 is converted by the diffuser plate 261 into left-handed circularly polarized blue light BLc2. The blue light BLc2 outputted from the diffuser 26 passes through the first light collector 25 in the direction +Z and is then incident on the first retardation element 24 again. At this point, the blue light BLc2 incident from the first light collector 25 on the first retardation element 24 is converted by the first retardation element 24 into the P-polarized blue light BLp. The P-polarized blue light BLp passes through the first optical element 22 in the direction +Z and enters the first color separator 29.

Configuration of Second Light Collector

The second light collector 27 is disposed in a position shifted in the direction −Z from the second optical element 23. That is, the second light collector 27 is disposed in the axis Z between the second optical element 23 and the wavelength converter 28. The second light collector 27 focuses the P-polarized blue light BLp reflected off the fourth optical layer 232 of the second optical element 23 and incident along the direction −Z on the wavelength converter 28. The second light collector 27 parallelizes the yellow light YL emitted from the wavelength converter 28 and incident along the direction +Z and outputs the parallelized yellow light YL toward the second optical element 23. In the example shown in FIG. 3, the second light collector 27 is formed of a first lens 271 and a second lens 272, but the number of lenses that form the second light collector 27 is not limited to a specific number.

Configuration of Wavelength Converter

The wavelength converter 28 is disposed in a position shifted in the direction −Z from the second light collector 27. That is, the wavelength converter 28 is disposed in a position shifted in the direction −Z from the third optical layer 231 of the second optical element 23. The wavelength converter 28 is a reflective wavelength converter that is excited when light is incident thereon and emits light having a wavelength band different from the wavelength band of the light incident on the wavelength converter 28 in a direction opposite the direction of incident light. In other words, the wavelength converter 28 converts in terms of wavelength the P-polarized blue light BLp incident from the fourth optical layer 232 along the direction −Z and outputs the yellow light YL having a yellow wavelength band different from the blue wavelength band in the direction +Z.

In the present embodiment, the wavelength converter 28 contains a yellow phosphor that is excited by blue light and emits yellow light. Specifically, the wavelength converter 28 contains, for example, an yttrium-aluminum-garnet-based (YAG-based) phosphor containing cerium (Ce) as an activator. The wavelength converter 28 emits fluorescence having a wavelength band formed of wavelengths longer than those in the blue wavelength band of the blue light BLs incident along the direction −Z, that is, unpolarized yellow light YL in the direction +Z. The yellow light YL has a wavelength band ranging, for example, from 500 to 700 nm. The yellow light YL is light containing a green light component and a red light component, and the wavelength band of the yellow light YL includes the green wavelength band and the red wavelength band.

The fluorescence having the wavelength band including the green wavelength band and the red wavelength band in the present embodiment, that is, the unpolarized yellow light YL corresponds to the second light having a second wavelength band in the appended claims.

The yellow light YL emitted from the wavelength converter 28 passes along the direction +Z through the second light collector 27, which parallelizes the yellow light YL, and the parallelized yellow light YL is then incident on the second optical element 23. The wavelength converter 28 in the present embodiment is a fixed wavelength converter and may be replaced with a rotary wavelength converter including a rotator that rotates the wavelength converter 28 around an axis of rotation parallel to the axis Z. In this case, an increase in the temperature of the wavelength converter 28 can be suppressed, whereby the wavelength conversion efficiency can be increased.

The third optical layer 231 of the second optical element 23 has polarization separation characteristics that cause the third optical layer 231 to reflect the S-polarized light and transmit the P-polarized light out of the light having the wavelength band including the green wavelength band and the red wavelength band, as shown in FIG. 4. Therefore, out of the unpolarized yellow light YL incident on the third optical layer 231, the S-polarized yellow light YLs is reflected off the third optical layer 231 in the direction −X and then incident on the second optical layer 222 of the first optical element 22. Since the second optical layer 222 is characterized in that it reflects the S-polarized light out of the light having the wavelength band including the green wavelength band and the red wavelength band, the S-polarized yellow light YLs incident on the second optical layer 222 along the direction −X is reflected off the second optical layer 222 in the direction +Z and enters the first color separator 29.

On the other hand, out of the unpolarized yellow light YL incident on the third optical layer 231, the P-polarized yellow light YLp passes through the third optical layer 231 in the direction +Z. Furthermore, since the fourth optical layer 232 is characterized in that it transmits the P-polarized light having the wavelength band including the green wavelength band and the red wavelength band, the P-polarized yellow light YLp passes through the fourth optical layer 232 in the direction +Z. The P-polarized yellow light YLp thus exits out of the second optical element 23 along the direction +Z and is incident on the third retardation element 32.

The P-polarized yellow light YLp in the present embodiment corresponds to the second light polarized in the first polarization direction in the appended claims. The S-polarized yellow light YLs in the present embodiment corresponds to the second light polarized in the second polarization direction in the appended claims.

Configuration of First Color Separator

Figure 6:
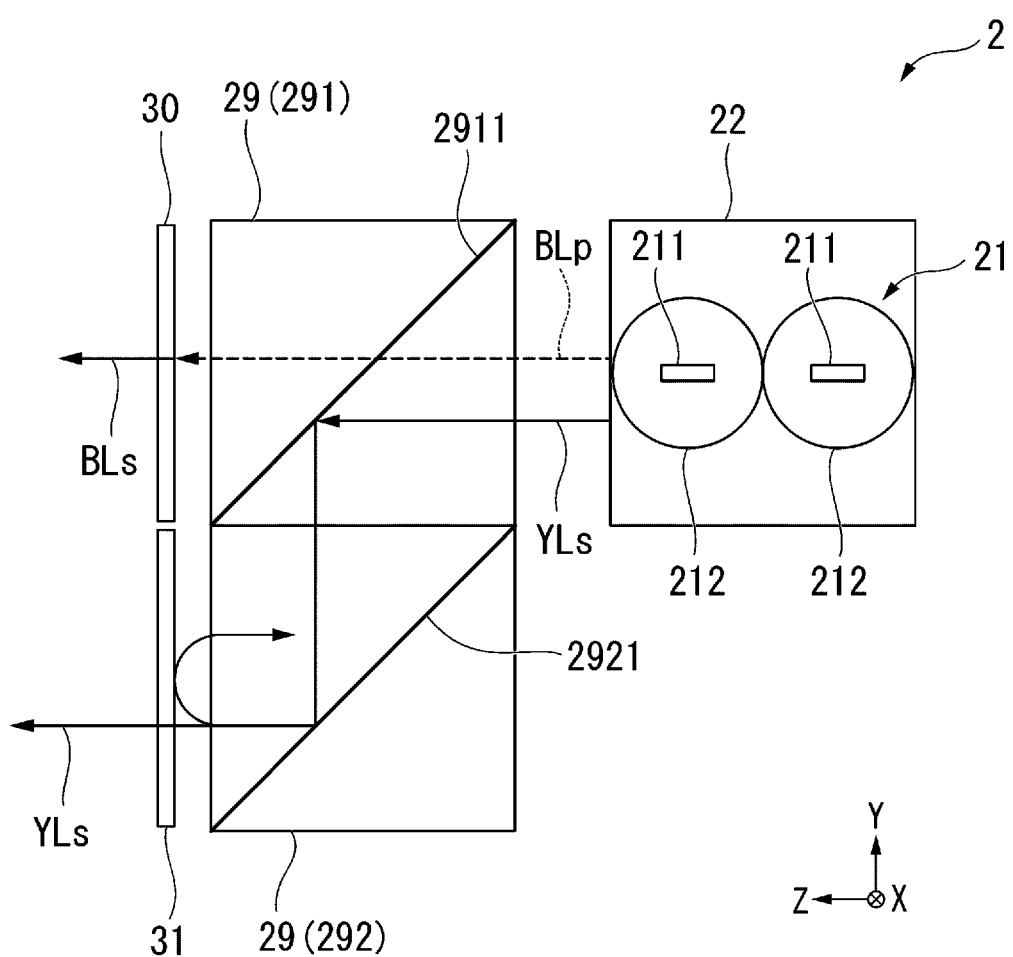
FIG. 6 is a side view of the light source apparatus viewed in a direction −X.

FIG. 6 is a side view of the light source apparatus 2 viewed in the direction −X. That is, FIG. 6 shows the first color separator 29, the fourth retardation element 30, the reflector 31, and other components viewed in the direction −X. In FIG. 6, the rotary retarder 213, the first retardation element 24, the first light collector 25, the diffuser 26, the second light collector 27, the wavelength converter 28, and other components are omitted for ease of illustration.

The first color separator 29 is disposed in a position shifted in the direction +Z from the first optical element 22, as shown in FIG. 6. The first color separator 29 includes a dichroic prism 291 and a reflection prism 292. The dichroic prism 291 and the reflection prism 292 are arranged side by side along the axis Y. The first color separator 29 separates the light having exited out of the first optical element 22 along the direction +Z into the blue light BLp and the yellow light YLs.

The light containing the blue light BLp and the yellow light YLs having exited out of the first optical element 22 enters the dichroic prism 291. The dichroic prism 291 is formed of a prism-shaped color separator that is the combination of two bases each having a substantially right-angled isosceles triangular shape and has a substantially rectangular solid shape as a whole. A color separation layer 2911 is provided at the interface between the two bases. The color separation layer 2911 inclines by 45° with respect to the axes Y and Z. In other words, the color separation layer 2911 inclines by 45° with respect to the planes XY and XZ.

The color separation layer 2911 functions as a dichroic mirror that transmits blue light and reflects color light having a wavelength band formed of wavelengths longer than those in the blue wavelength band, that is, yellow light, out of the light incident on the color separation layer 2911. Therefore, out of the light having entered the dichroic prism 291 from the first optical element 22, the blue light BLp passes through the color separation layer 2911 in the direction +Z and exits out of the dichroic prism 291.

On the other hand, out of the light having entered the dichroic prism 291 from the first optical element 22, the yellow light YLs is reflected off the color separation layer 2911 in the direction −Y. The dichroic prism 291 may be replaced with a dichroic mirror including the color separation layer 2911. The first color separator 29 may be formed of a polarization separator including a polarization separation layer and the reflection prism 292. Even when the first color separator 29 employs, for example, a polarization separator that transmits the blue light BLp in the direction +Z and reflects the yellow light YLs in the direction −Y toward the reflection prism 292 in place of the dichroic prism 291, the blue light BLp and the yellow light YLs can be separated from each other as in the case of the first color separator 29 including the dichroic prism 291.

The reflection prism 292 is disposed in a position shifted in the direction −Y from the dichroic prism 291. The yellow light YLs reflected off the color separation layer 2911 enters the reflection prism 292. The reflection prism 292 is a prism-shaped reflector that is the combination of two bases each having a substantially right-angled isosceles triangular shape and has a substantially rectangular solid shape as a whole. A reflection layer 2921 is provided at the interface between the two bases. The reflection layer 2921 inclines by 45° with respect to the directions +Y and +Z. In other words, the reflection layer 2921 inclines by 45° with respect to the planes XY and XZ. That is, the reflection layer 2921 and the color separation layer 2911 are disposed in parallel to each other.

The reflection layer 2921 reflects in the direction +Z the yellow light YLs incident from the dichroic prism 291 in the direction −Y. The yellow light YLs reflected off the reflection layer 2921 exits in the direction +Z out of the reflection prism 292. The reflection prism 292 may be replaced with a plate-shaped reflection mirror including the reflection layer 2921.

Configuration of Fourth Retardation Element

The fourth retardation element 30 is disposed in a position shifted in the direction +Z from the dichroic prism 291. In other words, the fourth retardation element 30 is located in the optical path of the blue light BLp having exited out of the dichroic prism 291. The fourth retardation element 30 is formed of a half-wave plate for the blue wavelength band of the blue light BLp incident on the fourth retardation element 30. The fourth retardation element 30 converts the P-polarized blue light BLp incident from the dichroic prism 291 into the S-polarized blue light BLs. The S-polarized blue light BLs produced by the fourth retardation element 30 is outputted in the direction +Z from the light source apparatus 2 and enters the homogenizer 4 shown in FIG. 1. The fourth retardation element 30 may be so provided as to be in contact with a surface of the dichroic prism 291 that is the surface via which the blue light BLp exits.

Configuration of Reflector

The reflector 31 is disposed in a position shifted in the direction +Z from the reflection prism 292. In other words, the reflector 31 is disposed in the optical path of the yellow light YLs having exited out of the reflection prism 292. The reflector 31 is formed of a half-silvered mirror that transmits part of the light incident on the reflector 31 and reflects the other part of the light. It is, however, noted that the transmittance and reflectance of the half-silvered mirror may be arbitrarily set in accordance with the white balance of the light L outputted from the light source apparatus 2. For example, the transmittance is set at 80%, and the reflectance is set at 20%.

Therefore, part of the yellow light YLs incident on the reflector 31 passes through the reflector 31, exits out of the light source apparatus 2 in the direction +Z, and enters the homogenizer 4 shown in FIG. 1. That is, the yellow light YLs is spatially separated from the blue light BLs, exits via a light exiting position different from the light exiting position via which the blue light BLs exits out of the light source apparatus 2, and enters the homogenizer 4. In detail, the yellow light YLs exits via a light exiting position separate in the direction −Y from the light exiting position via which the blue light BLs exits out of the light source apparatus 2 and enters the homogenizer 4.

On the other hand, the other part of the yellow light YLs incident on the reflector 31 is reflected off the reflector 31 and enters again the reflection prism 292. The other part of the yellow light YLs that has entered the reflection prism 292 is reflected off the reflection layer 2921 in the direction +Y and returns to the wavelength converter 28 via the dichroic prism 291, the first optical element 22, the second optical element 23, and the second light collector 27.

The yellow phosphor contained in the wavelength converter 28 hardly absorbs yellow light externally incident on the yellow phosphor. The yellow light YLs having returned to the wavelength converter 28 is therefore not absorbed by the interior of the wavelength converter 28 and is converted into the unpolarized yellow light YL when repeatedly reflected or scattered. The unpolarized yellow light YL exits again out of the wavelength converter 28 along with the yellow light YL newly generated in the yellow phosphor. The yellow light YL emitted from the wavelength converter 28 is incident on the second optical element 23 via the second light collector 27, as described above. The ratio between the amount of yellow light YLs passing through the reflector 31 and the amount of yellow light YLs reflected off the reflector 31 can be set in advance, as described above. The reflector 31 may instead be so provided as to be in contact with a surface of the reflection prism 292 that is the surface via which the yellow light YLs exits.

Configuration of Third Retardation Element

Figure 7:
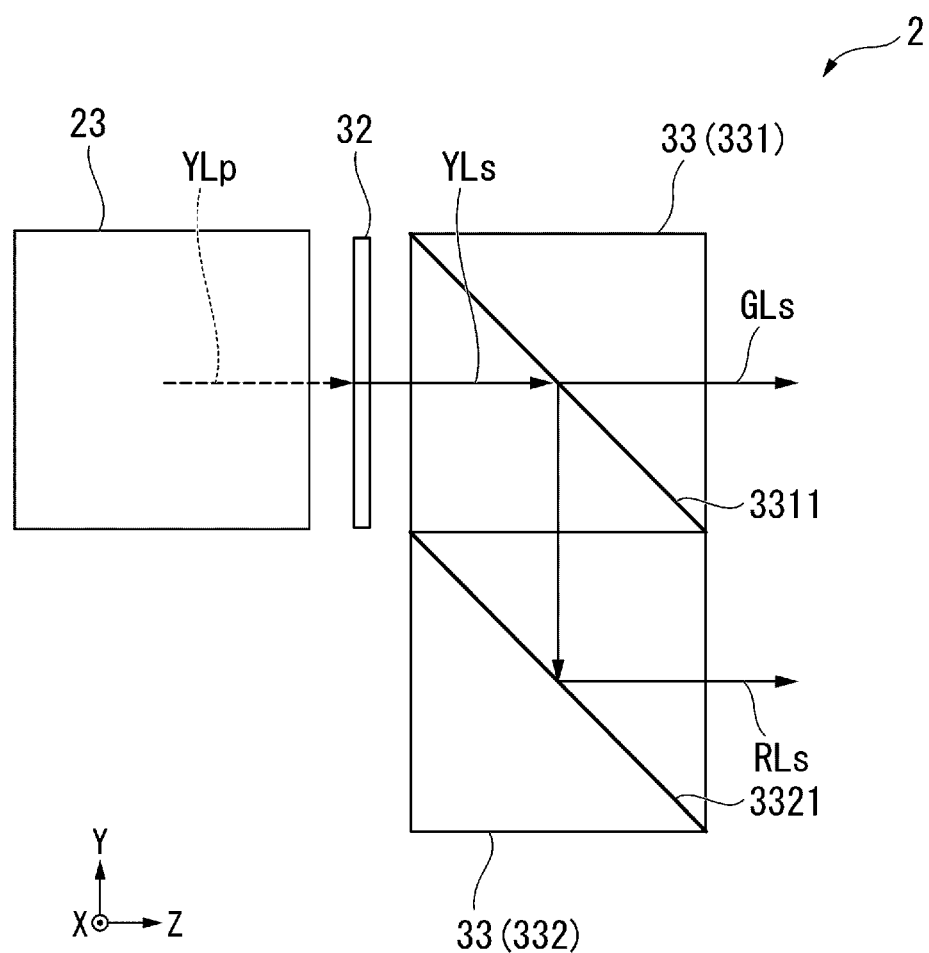
FIG. 7 is a side view of the light source apparatus 2 viewed in a direction +X.

FIG. 7 is a side view of the light source apparatus 2 viewed in the direction +X. In other words, FIG. 7 shows the third retardation element 32 and the second color separator 33 viewed in the direction +X. In FIG. 7, the rotary retarder 213, the first retardation element 24, the first light collector 25, the diffuser 26, the second light collector 27, the wavelength converter 28, and other components are omitted for ease of illustration.

The third retardation element 32 is disposed in a position shifted in the direction +Z from the second optical element 23, as shown in FIGS. 3 and 7. The yellow light YLp having passed through the second optical element 23 is incident on the third retardation element 32. The third retardation element 32 is formed of a half-wave plate for the wavelength band of the yellow light YLp. The third retardation element converts the P-polarized yellow light YLp into the S-polarized yellow light YLs. The converted S-polarized yellow light YLs enters the second color separator 33.

Configuration of Second Color Separator

The second color separator 33 is disposed in a position shifted in the direction +Z from the third retardation element 32, as shown in FIG. 7. That is, the second color separator 33 is disposed in a position shifted in the direction +Z from the second optical element 23. The second color separator 33 includes a dichroic prism 331 and a reflection prism 332. The dichroic prism 331 and the reflection prism 332 are arranged side by side along the axis Y. The second color separator 33 separates the yellow light YLs having exited in the direction +Z out of the second optical element 23 and having been converted into the S-polarized light by the third retardation element 32 into the green light GLs and the red light RLs.

The dichroic prism 331 is formed of a prism-shaped color separator, as the dichroic prism 291 is. A color separation layer 3311 is provided at the interface between the two bases. The color separation layer 3311 inclines by 45° with respect to the directions +Y and +Z. In other words, the color separation layer 3311 inclines by 45° with respect to the planes XY and XZ. The color separation layer 3311 and the reflection layer 3321 are disposed in parallel to each other.

The color separation layer 3311 functions as a dichroic mirror that transmits the green light component and reflects the red light component of the light incident on the color separation layer 3311. Therefore, out of the yellow light YLs having entered the dichroic prism 331, the S-polarized green light GLs passes through the color separation layer 3311 in the direction +Z and exits out of the dichroic prism 331. The S-polarized green light GLs is outputted in the direction +Z from the light source apparatus 2 and enters the homogenizer 4 shown in FIG. 1. That is, the green light GLs is spatially separated from the blue light BLs and the yellow light YLs, exits via a position different from the positions via which the blue light BLs and the yellow light YLs exit, and enters the homogenizer 4. In other words, the green light GLs exits via a light exiting position separate in the direction +X from the light exiting position via which the blue light BLs exits out of the light source apparatus 2 and enters the homogenizer 4.

On the other hand, out of the yellow light YLs having entered the dichroic prism 331, the S-polarized red light RLs is reflected off the color separation layer 3311 in the direction −Y. The dichroic prism 331 may be replaced with a dichroic mirror including the color separation layer 3311.

The reflection prism 332 has the same configuration as that of the reflection prism 292. That is, the reflection prism 332 includes a reflection layer 3321 parallel to the color separation layer 2911, the color separation layer 3311, and the reflection layer 2921.

The reflection layer 3321 reflects in the direction +Z the red light RLs reflected off the color separation layer 3311 and incident on the reflection layer 3321. The red light RLs reflected off the reflection layer 3321 exits out of the reflection prism 332. The red light RLs is outputted in the direction +Z from the light source apparatus 2 and enters the homogenizer 4 shown in FIG. 1. That is, the red light RLs is spatially separated from the blue light BLs, the yellow light YLs, and the green light GLs, exits via a position different from the positions via which the blue light BLs, the yellow light YLs, and the green light GLs exit, and enters the homogenizer 4. In other words, the red light RLs exits via a light exiting position separate in the direction −Y from the light exiting position via which the green light GLs exits out of the light source apparatus 2 and separate in the direction +X from the light exiting position via which the yellow light YLs exits out of the light source apparatus 2 and enters the homogenizer 4.

Configuration of Homogenizer

The homogenizer 4 homogenizes the illuminance in an image formation area of the light modulator 6, which is irradiated with the light outputted from the light source apparatus 2, as shown in FIG. 1. The homogenizer 4 includes a first multi-lens 41, a second multi-lens 42, and a superimposing lens 43.

The first multi-lens 41 includes a plurality of lenses 411 arranged in a matrix in a plane perpendicular to the center axis of the light L incident from the light source apparatus 2, that is, the illumination optical axis Ax. The plurality of lenses 411 of the first multi-lens 41 divide the light incident from the light source apparatus 2 into a plurality of sub-luminous fluxes.

Figure 8:
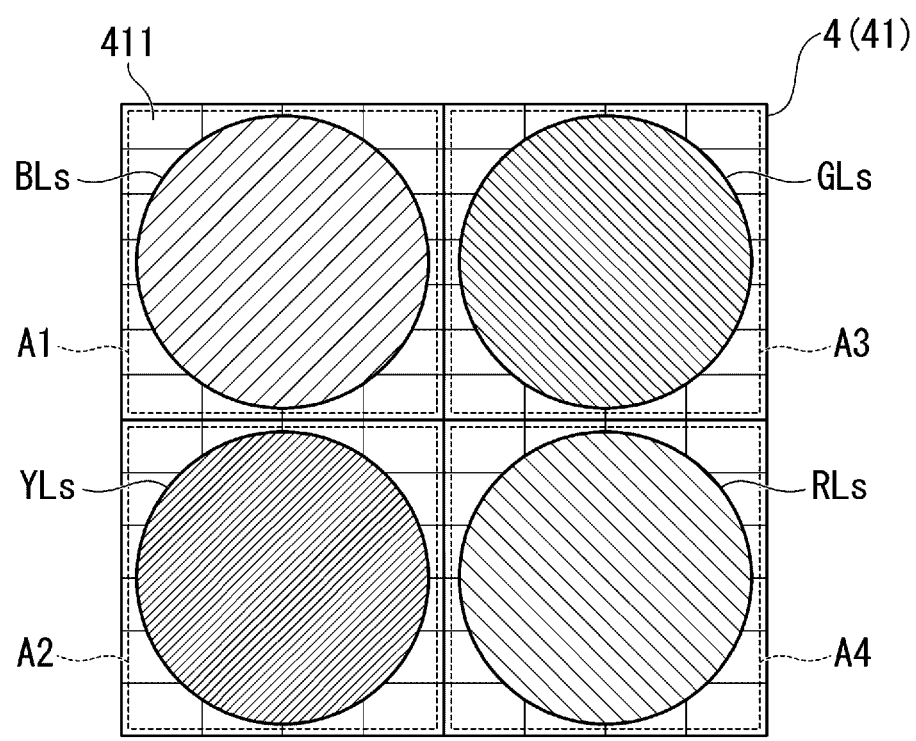
FIG. 8 is a diagrammatic view showing color luminous flux incident positions on a multi-lens.

FIG. 8 is a diagrammatic view showing the color luminous flux incident positions on the first multi-lens 41 viewed in the direction −Z.

The blue light BLs, the yellow light YLs, the green light GLs, and the red light RLs outputted from the light source apparatus 2 enter the first multi-lens 41, as shown in FIG. 8. The blue light BLs having exited out of the light source apparatus 2 via the position shifted in the directions −X and +Y enters a plurality of lenses 411 contained in an area A1 of the first multi-lens 411 that is the area shifted in the directions −X and +Y. The yellow light YLs having exited out of the light source apparatus 2 via the position shifted in the directions −X and −Y enters a plurality of lenses 411 contained in an area A2 of the first multi-lens 41 that is the area shifted in the directions −X and −Y.

The green light GLs having exited out of the light source apparatus 2 via the position shifted in the directions +X and +Y enters a plurality of lenses 411 contained in an area A3 of the first multi-lens 41 that is the area shifted in the directions +X and +Y. The red light RLs having exited out of the light source apparatus 2 via the position shifted in the directions +X and −Y enters a plurality of lenses 411 contained in an area A4 of the first multi-lens 41 that is the area in the directions +X and −Y. The color luminous fluxes having entered the lenses 411 form a plurality of sub-luminous fluxes, which enter lenses 421 of the second multi-lens 42, which correspond to the lenses 411.

Out of the light L outputted from the light source apparatus 2 according to the present embodiment, the blue light BLs corresponds to the third light in the appended claims, the yellow light YLs corresponds to the fourth light in the appended claims, the green light GLs corresponds to the fifth light in the appended claims, and the red light RLs corresponds to the sixth light in the appended claims.

The second multi-lens 42 includes a plurality of lenses 421 arranged in a matrix in the plane perpendicular to the illumination optical axis Ax and corresponding to the plurality of lenses 411 of the first multi-lens 41, as shown in FIG. 1. The lenses 421 receive a plurality of sub-luminous fluxes having exited out of the lenses 411 corresponding to the lenses 421. The lenses 421 cause the sub-luminous fluxes incident thereon to enter the superimposing lens 43.

The superimposing lens 43 superimposes the plurality of sub-luminous fluxes incident from the second multi-lens 42 with one another in the image formation area of the light modulator 6. In detail, the second multi-lens 42 and the superimposing lens 43 cause the blue light BLs, the yellow light YLs, the green light GLs, and the red light RLs, each of which has been divided into a plurality of sub-luminous fluxes, to enter a plurality of microlenses 621, which form a microlens array 62 of the light modulator 6, via the field lens 5, at different angles.

Configuration of Light Modulator

The light modulator 6 modulates the light outputted from the light source apparatus 2, as shown in FIG. 1. In detail, the light modulator 6 modulates the color luminous fluxes outputted from the light source apparatus 2 and incident on the light modulator 6 via the homogenizer 4 and the field lens 5 in accordance with image information to form image light according to the image information. The light modulator 6 includes one liquid crystal panel 61 and one microlens array 62.

Configuration of Liquid Crystal Panel

Figure 9:
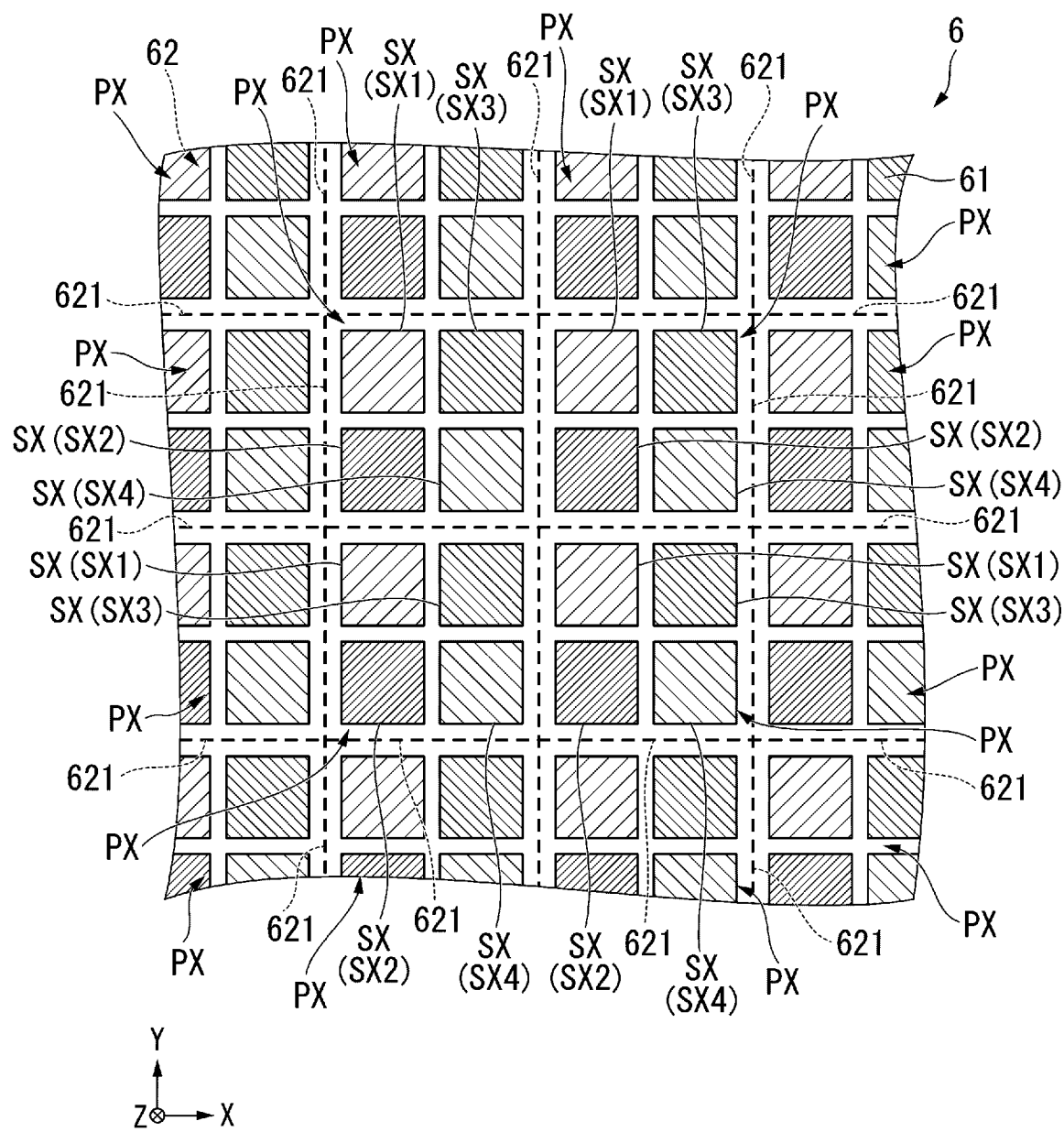
FIG. 9 is an enlarged view of a light modulator.

FIG. 9 is a diagrammatic enlarged view of part of the light modulator 6 viewed in the direction −Z. In other words, FIG. 9 shows the correspondence between pixels PX provided in the liquid crystal panel 61 and the microlenses 621 provided in the microlens array 62.

The liquid crystal panel 61 has a plurality of pixels PX arranged in a matrix in the plane perpendicular to the illumination optical axis Ax, as shown in FIG. 9.

The pixels PX each have a plurality of sub-pixels SX, which modulate color luminous fluxes having different colors from one another. In the present embodiment, the pixels PX each have four sub-pixels SX (SX1 to SX4). Specifically, in one pixel PX, a first sub-pixel SX1 is located in a position shifted in the directions −X and +Y. A second sub-pixel SX2 is located in a position shifted in the directions −X and −Y. A third sub-pixel SX3 is located in a position shifted in the directions +X and +Y. A fourth sub-pixel SX4 is located in a position shifted in the directions +X and −Y.

Configuration of Microlens Array

The microlens array 62 is provided in a position shifted in the direction −Z, which is the direction facing the light incident side, from the liquid crystal panel 61, as shown in FIG. 1. The microlens array 62 guides the color luminous fluxes that enter the microlens array 62 to the individual pixels PX. The microlens array 62 has the plurality of microlenses 621 corresponding to the plurality of pixels PX.

The plurality of microlenses 621 are arranged in a matrix in a plane perpendicular to the illumination optical axis Ax, as shown in FIG. 9. In other words, the plurality of microlenses 621 are arranged in a matrix in a plane perpendicular to the center axis of the light incident from the field lens 5. In the present embodiment, one microlens 621 is provided in correspondence with two sub-pixels arranged in the direction +X and two sub-pixels arranged in the direction +Y. That is, one microlens 621 is provided in correspondence with four sub-pixels SX1 to SX4, which are arranged in two rows and two columns in the plane XY.

The blue light BLs, the yellow light YLs, the green light GLs, and the red light RLs superimposed on one another by the homogenizer 4 are incident on each of the microlenses 621 at angles different from one another. The microlenses 621 each cause each of the color luminous fluxes incident on the microlens 621 to be incident on the sub-pixel SX corresponding to the color luminous flux. Specifically, the microlenses 621 each cause the blue light BLs to be incident on the first sub-pixel SX1, the yellow light YLs to be incident on the second sub-pixel SX2, the green light GLs to be incident on the third sub-pixel SX3, and the red light RLs to be incident on the fourth sub-pixel SX4 among the sub-pixels SX of the pixel PX corresponding to the microlens 621. The sub-pixels SX1 to SX4 thus receive the color luminous fluxes corresponding to the sub-pixels SX1 to SX4 and modulate the corresponding color luminous fluxes. The image light thus modulated by the liquid crystal panel 61 is projected by the projection optical apparatus 7 onto a projection receiving surface that is not shown.

Effects of First Embodiment

In the related-art projector described in JP-A-4-60538, a lamp is used as the light source. Since the light outputted from the lamp does not have an aligned polarization direction, using a liquid crystal panel as the light modulator requires a polarization conversion section that achieves an aligned polarization direction. The projector typically uses a polarization conversion section including a multi-lens array and a polarization separator (PBS) array. To reduce the size of the projector, however, a small-interval multi-lens array and a small-interval PBS array are required, but it is very difficult to produce a small-interval PBS array.

To address the problem described above, the light source apparatus 2 according to the present embodiment includes the light source section 21, which outputs blue light having a blue wavelength band and containing the P-polarized blue light BLp and the S-polarized blue light BLs, the first optical layer 221, which transmits in the direction +X the P-polarized blue light BLp incident from the light source section 21 along the direction +X and reflects in the direction −Z the S-polarized blue light BLs incident from the light source section 21 along the direction +X, the second optical layer 222, which is disposed in a position shifted in the direction +X from the first optical layer 221 and transmits in the direction +X the P-polarized blue light BLp incident from the first optical layer 221 along the direction +X, the third optical layer 231, which is disposed in a position shifted in the direction +X from the second optical layer 222 and transmits in the direction +X the P-polarized blue light BLp incident from the second optical layer 222 along the direction +X, the fourth optical layer 232, which is disposed in a position shifted in the direction +X from the third optical layer 231 and reflects in the direction −Z the P-polarized blue light BLp incident from the third optical layer 231 along the direction +X, the diffuser plate 261, which is disposed in a position shifted in the direction −Z from the first optical layer 221, diffuses the blue light BLc1 incident from the first optical layer 221 along the direction −Z, and outputs the diffused blue light BLc2 in the direction +Z, and the wavelength converter 28, which is disposed in a position shifted in the direction −Z from the third optical layer 231, converts in terms of wavelength the P-polarized blue light BLp incident from the fourth optical layer 232 along the direction −Z, and outputs the yellow light YL having the wavelength band including the green wavelength band and the red wavelength band in the direction +Z. The third optical layer 231 receives the yellow light YL from the wavelength converter 28 along the direction +Z, transmits the P-polarized yellow light YLp in the direction +Z, and reflects the S-polarized yellow light YLs in the direction −X. The fourth optical layer 232 receives the P-polarized yellow light YLp from the wavelength converter 28 along the direction +Z and transmits the P-polarized yellow light YLp in the direction +Z. The second optical layer 222 receives the S-polarized yellow light YLs from the third optical layer 231 along the direction −X and reflects the S-polarized yellow light YLs in the direction +Z. The first optical layer 221 receives the blue light BLp outputted from the diffuser plate 261 along the direction +Z and transmits in the direction +Z the blue light BLp incident on the first optical layer 221. The second optical layer 222 receives the blue light BLp having exited out of the first optical layer 221 along the direction +Z and transmits in the direction +Z the blue light BLp incident on the second optical layer 222.

The light source apparatus 2 according to the present embodiment outputs four color luminous fluxes having an aligned polarization direction, that is, the S-polarized blue light BLs, the S-polarized yellow light YLs, the S-polarized green light GLs, and the S-polarized red light RLs, as described above. According to the configuration described above, a light source apparatus 2 capable of outputting a plurality of color luminous fluxes spatially separated from one another and having an aligned polarization direction can be achieved without using a small-interval polarization converter, such as that described above. The size of the light source apparatus 2 can thus be reduced, and the size of the projector 1 can in turn be reduced.

Furthermore, in the projector 1 according to the present embodiment, the yellow light YLs enters the light modulator 6 in addition to the blue light BLs, the green light GLs, and the red light RLs, whereby the brightness of an image to be projected from the projection optical apparatus 7 can be increased.

To consider a light source apparatus that provides the same effects described above, assuming that the same light source section as in the present embodiment is used, it is conceivable to employ, for example, a configuration in which two prism-shaped polarization separators formed of a first polarization separator and a second polarization separator are sequentially arranged in the direction +X, a diffusion element is disposed in a position shifted in the direction −Z from the first polarization separator, and a wavelength converter is disposed in a position shifted in the direction −Z from the second polarization separator, and four color luminous fluxes produced by the diffusion element and the wavelength converter are outputted in the direction +Z. The light source apparatus described above is hereinafter referred to as a light source apparatus according to Comparative Example.

In the light source apparatus according to Comparative Example, it is necessary to cause the S-polarized blue light BLs reflected off the first polarization separator in the direction −Z to be incident on the diffusion element and the P-polarized blue light BLp having passed through the first polarization separator in the direction +X to be reflected off the second polarization separator in the direction −Z and enter the wavelength converter. That is, it is necessary to transmit the P-polarized blue light BLp through the first polarization separator and reflect the P-polarized blue light BLp off the second polarization separator.

A polarization separation film used in a prism-shaped polarization separator is, however, typically characterized in that the film reflects the S-polarized light and transmits the P-polarized light. Therefore, in achieving the light source apparatus according to Comparative Example, it is difficult to produce a prism-shaped second polarization separator that reflects the P-polarized blue light BLp.

Specifically, to achieve the characteristics described above, the number of dielectric multilayer films that form the polarization separation film of the second polarization separator needs to be extremely large, and it is difficult to form the dielectric multilayer films. Another problem with the very large number of dielectric multilayer films is that the films absorb a large amount of light, resulting in optical loss. Furthermore, the polarization separation film of the second polarization separator corresponding to the second optical element in the present embodiment needs to have polarization separation characteristics that causes the polarization separation film to reflect the S-polarized yellow light and transmit the P-polarized yellow light, so that it is more difficult to produce a polarization separation film that reflects the P-polarized blue light with the polarization separation characteristics for the yellow light maintained.

To address the problem described above, in the light source apparatus 2 according to the present embodiment, the second optical element 23 is formed of a plate-shaped optical element and includes the third optical layer 231 and the fourth optical layer 232. The function that the single polarization separation film of the second polarization separator requires in the light source apparatus according to Comparative Example can thus be divided and assigned to two optical layers formed of the third optical layer 231 and the fourth optical layer 232 in the light source apparatus 2 according to the present embodiment. Similarly, the first optical element 22 in the present embodiment is formed of a plate-shaped optical element, the function that the single polarization separation film of the first polarization separator requires in the light source apparatus according to Comparative Example can be divided and assigned to two optical layers formed of the first optical layer 221 and the second optical layer 222 in the light source apparatus 2 according to the present embodiment.

As a result, in the present embodiment, the third optical layer 231 may transmit at least the P-polarized blue light BLp and have polarization separation characteristics for the light having the wavelength band including the green wavelength band and the red wavelength band. The fourth optical layer 232 may be characterized in that it reflects at least the P-polarized blue light BLp out of the light having the blue wavelength band and transmits at least the P-polarized yellow light YLp out of the light having the wavelength band including the green wavelength band and the red wavelength band. The first optical element 22 in the present embodiment may also have the polarization separation characteristics for the light having the blue wavelength band because the first optical layer 221 receives no yellow light.

The second optical layer 222 may be characterized in that it transmits the P-polarized blue light BLp and reflects the S-polarized yellow light YLp.

As described above, in the light source apparatus 2 according to the present embodiment, the dielectric multilayer films that form all the optical layers 221, 222, 231, and 232 are not required to have special characteristics, such as polarization separation characteristics that also cause the dielectric multilayer films to each reflect the P-polarized light. The dielectric multilayer films that form the optical layers 221, 222, 231, and 232 are therefore readily formed. Specifically, since the number of layers of each of the dielectric multilayer films can be reduced, manufacturing costs can be reduced and yields can be improved. Furthermore, the optical layer 221, 222, 231, and 232 having excellent light separation characteristics can be produced. As described above, the light source apparatus 2 according to the present embodiment can solve the aforementioned problems with the light source apparatus according to Comparative Example.

The light source apparatus 2 according to the present embodiment further includes the first retardation element 24, which is provided between the first optical layer 221 and the diffuser plate 261 and on which the S-polarized blue light BLs is incident along the direction +X from the first optical layer 221.

According to the configuration described above, the first retardation element 24 can convert the circularly polarized blue light BLc2 having exited out of the diffuser plate 261 into the P-polarized blue light BLp, which can then pass through the first optical layer 221 and the second optical layer 222 of the first optical element 22. The blue light BLc2 having exited out of the diffuser plate 261 can thus be used more efficiently.

In the light source apparatus 2 according to the present embodiment, the light source section 21 includes the light emitters 211, which output the blue light BLs having the blue wavelength band, and the second retardation element 2131, on which the blue light BLs outputted from the light emitters 211 is incident and which outputs the blue light containing the S-polarized blue light BLs and the P-polarized blue light BLp.

The configuration described above allows the P-polarized blue light BLp and the S-polarized blue light BLs to be reliably incident on the first optical element 22. Furthermore, according to the configuration described above, since the blue luminous fluxes outputted from the plurality of light emitters 211 may have the same polarization direction, solid-state light sources of the same type may be arranged in the same orientation, whereby the configuration of the light source section 21 can be simplified.

In the light source apparatus 2 according to the present embodiment, the second retardation element 2131 is rotatable around an axis of rotation along the traveling direction of the blue light BLs incident on the second retardation element 2131.

According to the configuration described above, adjusting the angle of rotation of the second retardation element 2131 allows adjustment of the ratio between the amount of blue light BLs and the amount of blue light BLp to be incident on the first optical element 22. The ratio between the amount of blue light BLs outputted from the light source apparatus 2 and the amount of yellow light YLs, green light GLs, and red light RLs outputted therefrom can thus be adjusted, whereby the white balance of the light from the light source apparatus 2 can be adjusted.

The light source apparatus 2 according to the present embodiment further includes the first light-transmissive base 220 disposed in a position shifted in the direction +X from the light source section 21, and the first light-transmissive base 220 has the first surface 220a facing the light source section 21 and the second surface 220b different from the first surface 220a, with the first optical layer 221 provided at the first surface 220a and the second optical layer 222 provided at the second surface 220b.

According to the configuration described above, the first light-transmissive base 220 can be used as a support substrate that supports the first optical layer 221 and the second optical layer 222. The plate-shaped first optical element 22 having a simple configuration can thus be produced.

The light source apparatus 2 according to the present embodiment further includes the second light-transmissive base 230 disposed in a position shifted in the direction +X from the first light-transmissive base 220, and the second light-transmissive base 230 has the third surface 230a facing the first light-transmissive base 220 and the fourth surface 230b different from the third surface 230a, with the third optical layer 231 provided at the third surface 230a and the fourth optical layer 232 provided at the fourth surface 230b.

According to the configuration described above, the second light-transmissive base 230 can be used as a support substrate that supports the third optical layer 231 and the fourth optical layer 232. The plate-shaped second optical element 23 having a simple configuration can thus be produced.

The light source apparatus 2 according to the present embodiment further includes the light tunnel 37 including the first reflection member 371 disposed in a position shifted in the direction +Y from the first light-transmissive base 220 and the second light-transmissive base 230, the second reflection member 372 disposed in a position shifted in the direction −Y from the first light-transmissive base 220 and the second light-transmissive base 230, and the third reflection member 373 disposed in a position shifted in the direction +X from the fourth optical layer 232.

As described above, the light source apparatus 2 according to the present embodiment uses the plate-shaped first and second optical elements 22, 23 to provide a variety of advantages over the light source apparatus according to Comparative Example, which uses prism-shaped optical elements. However, a disadvantage of using the plate-shaped first and second optical elements 22, 23 is that a prism-shaped optical element allows the light that exits out of the optical film at a wide angle to be totally reflected off the surface of the prism and therefore contribute to formation of the illumination light, whereas a plate-shaped optical element, in which the optical film is exposed to the air, causes the light that exits out of the optical film at a wide angle to travel in directions away from the optical path, cannot enter the downstream optical systems, and is probably lost.

To address the problem described above, the light source apparatus 2 according to the present embodiment is provided with the light tunnel 37, which surrounds the first optical element 22 and the second optical element 23, whereby even when there is, for example, light YLp2 that exits out of the second optical element 23 in a direction that deviates clockwise from the direction +Z, as shown in FIG. 3, the reflection surface of the third reflective member 373, that is, the inner surface of the light tunnel 37 can reflect the light YLp2 and cause it to be incident on the third retardation element 32. The loss of light that exits out of the first and second optical elements 22, 23 can thus be suppressed.

Furthermore, in the light source apparatus 2 according to the present embodiment, when the fourth optical layer 232 is formed of a dichroic mirror that reflects blue light and transmits yellow light, the configuration of the dielectric multilayer film that forms the fourth optical layer 232 can be simplified.

Moreover, in the light source apparatus 2 according to the present embodiment, when the second optical layer 222 is formed of a dichroic mirror that transmits blue light and reflects yellow light, the configuration of the dielectric multilayer film that forms the second optical layer 222 can be simplified.

The light source apparatus 2 according to the present embodiment further includes the first color separator 29, which is disposed in a position shifted in the direction +Z from the second optical layer 222 and separates the light having exited out of the second optical layer 222 into the blue light BLs and the yellow light YLs, and the second color separator 33, which is disposed in a position shifted in the direction +Z from the fourth optical layer 232 and separates the yellow light YLp having exited out of the fourth optical layer 232 into the green light GLs and the red light RLs.

According to the configuration described above, a light source apparatus 2 that outputs the blue light BLs, the yellow light YLs, the green light GLs, and the red light RLs via spatially separated locations can be achieved.

In the present embodiment, the third retardation element 32 is provided between the second optical element 23 and the second color separator 33, whereby the P-polarized yellow light YLp having exited out of the second optical element 23 can be converted into the S-polarized yellow light YLs. The green light GLs and the red light RLs having exited out of the second color separator 33 can thus be converted into the S-polarized light, whereby the blue light BLs, the yellow light YLs, the green light GLs, and the red light RLs outputted from the light source apparatus 2 can all be the S-polarized light.

In the present embodiment, the reflector 31, which reflects part of the yellow light YLs, is provided on a side of the first color separator 29 that is the side via which the yellow light YLs exits and allows adjustment of the ratio between the amount of yellow light YLs outputted from the light source apparatus 2 and the amount of green light GLs and red light RLs outputted therefrom. The white balance of the light from the light source apparatus 2 can thus be adjusted. Furthermore, the brightness of a projected image can be increased by increasing the ratio of the amount of yellow light YLs to the amount of other color luminous fluxes. Moreover, the color reproducibility of a projected image can be increased by increasing the ratio of the amount of green light GLs and red light RLs to the amount of other color luminous fluxes.

Furthermore, in the present embodiment, since the light source apparatus 2 includes the first light collector 25, which collects the blue light BLs toward the diffuser 26, the first light collector 25 can efficiently collect the blue light BLs having exited out of the first retardation element 24 onto the diffuser 26 and can also parallelize the blue light BLs outputted from the diffuser 26. Loss of the blue light BLs can thus be suppressed, whereby the blue light BLs can be used more efficiently.

In the present embodiment, since the light source apparatus 2 includes the second light collector 27, which collects the blue light BLp toward the wavelength converter 28, the second light collector 27 can efficiently collect the blue light BLp having exited out of the second optical element 23 onto the wavelength converter 28 and parallelize the yellow light YL emitted from the wavelength converter 28. Loss of the blue light BLp and the yellow light YL can thus be suppressed, whereby the blue light BLp and the yellow light YL can be used more efficiently.

The projector 1 according to the present embodiment includes the light source apparatus 2 according to the present embodiment, the light modulator 6, which modulates the light from the light source apparatus 2 in accordance with image information, and the projection optical apparatus 7, which projects the light modulated by the light modulator 6.

According to the configuration described above, a single-panel projector 1 that is compact and has excellent light utilization efficiency can be achieved.

The projector 1 according to the present embodiment further includes the homogenizer 4, which is located between the light source apparatus 2 and the light modulator 6.

According to the configuration described above, the light modulator 6 can be uniformly illuminated with the blue light BLs, the yellow light YLs, the green light GLs, and the red light RLs outputted from the light source apparatus 2. Unevenness in color and brightness of a projected image can thus be suppressed.

In the projector according to the present embodiment, the light modulator 6 includes the microlens array 62 including the plurality of microlenses 621 corresponding to the plurality of pixels PX.

According to the configuration described above, the microlenses 621 each allow the four color luminous fluxes incident on the light modulator 6 to be incident on the four corresponding sub-pixels SX of the liquid crystal panel 61. The color luminous fluxes outputted from the light source apparatus 2 can thus be efficiently incident on the sub-pixels SX, whereby the color luminous fluxes can be used more efficiently.

Second Embodiment

A second embodiment of the present disclosure will be described below with reference to FIGS. 10 and 11.

The basic configuration of the light source apparatus according to the second embodiment is the same as that according to the first embodiment, but the configuration of the reflector differs from that in the first embodiment. The entire light source apparatus will therefore not be described.

Figure 10:
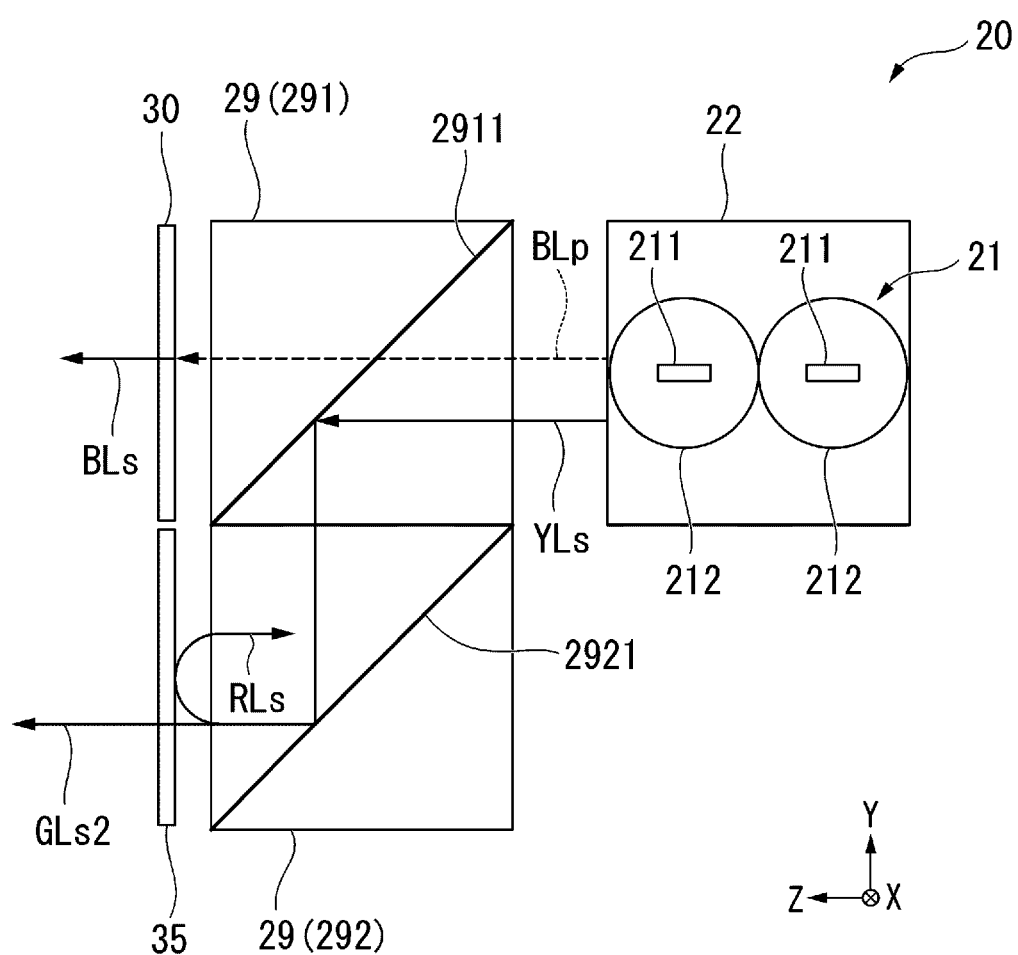
FIG. 10 is a side view of the light source apparatus according to a second embodiment viewed in the direction −X.

FIG. 10 is a side view of the light source apparatus according to the second embodiment viewed in the direction −X. FIG. 11 is a diagrammatic view showing the color luminous flux incident positions on the multi-lens. In FIG. 10, the rotary retarder 213, the first retardation element 24, the first light collector 25, and the diffuser 26 are omitted.

Figure 11:
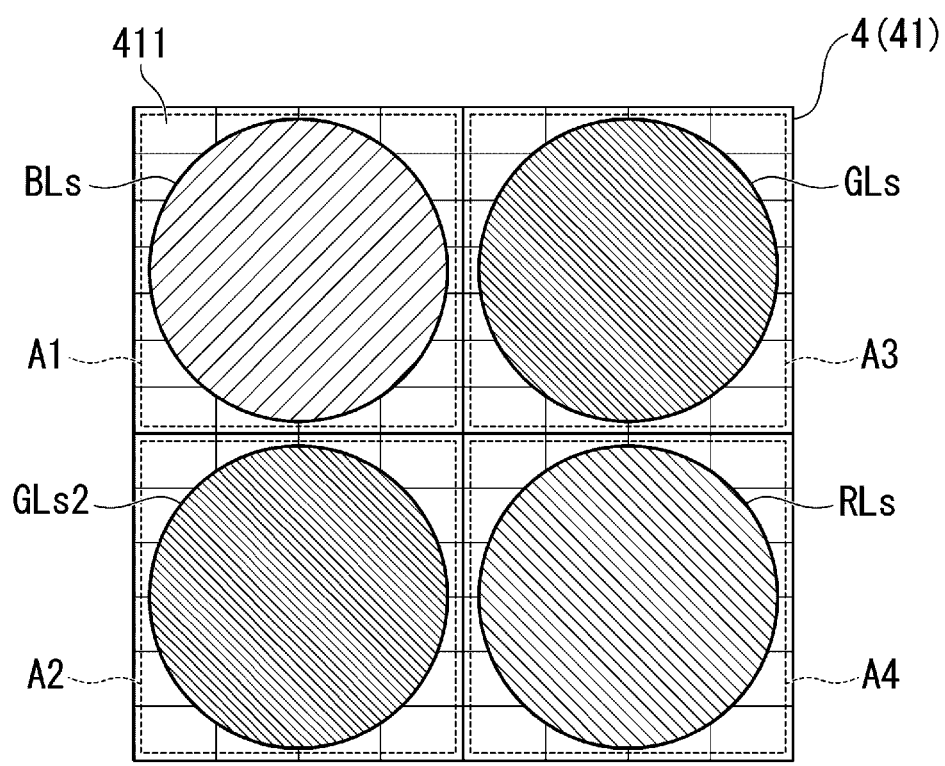
FIG. 11 is a diagrammatic view showing the color luminous flux incident positions on the multi-lens.

In FIGS. 10 and 11, components common to those in the figures used in the first embodiment have the same reference characters and will not be described.

Alight source apparatus 20 according to the present embodiment includes a third color separator 35 in place of the reflector 31 in the light source apparatus 2 according to the first embodiment, as shown in FIG. 10. That is, the third color separator 35 is disposed in a position shifted in the direction +Z from the reflection prism 292 in the optical path of the yellow light YLs separated by the first color separator 29. The third color separator 35 is formed of a dichroic mirror characterized in that it transmits the green light GLs and reflects the red light RLs.

Green light GLs2 contained in the yellow light YLs incident from the reflection prism 292 of the first color separator 29 on the third color separator 35 therefore passes through the third color separator 35 and exits out of the light source apparatus 20. That is, the light source apparatus 20 outputs the green light GLs2 in place of the yellow light YLs via the position via which the yellow light YLs exits out of the light source apparatus 2 according to the first embodiment.

Therefore, in the present embodiment, the green light GLs2 that exits via the position where the yellow light YLs exits corresponds to the fourth light in the appended claims.

On the other hand, the red light RLs contained in the yellow light YLs to be incident on the third color separator 35 is reflected off the third color separator 35 and enters the reflection prism 292 in the direction +Z. The red light RLs returns to the wavelength converter 28 via the first color separator 29, the first optical element 22, the second optical element 23, and the second light collector 27, as the yellow light YLs reflected off the reflector 31 does in the light source apparatus 2 according to the first embodiment.

The yellow phosphor contained in the wavelength converter 28 hardly absorbs externally incident yellow light, as described above, so that the yellow phosphor hardly absorbs red light RLs as well. The red light RLs having returned to the wavelength converter 28 is therefore repeatedly reflected inside the wavelength converter 28 into unpolarized red light, which then exits out of the wavelength converter 28 along with the yellow light YL generated by the yellow phosphor. Out of the red light having exited out of the wavelength converter 28, the S-polarized red light RLs is reflected off the third color separator 35 and returns again to the wavelength converter 28, while the P-polarized red light passes through the second optical element 23 in the direction +Z and exits out of the light source apparatus 20. A dichroic prism may be used as the third color separator 35.

The light source apparatus 20 outputs the blue light BLs, the green light GLs2, the green light GLs, and the red light RLs, as shown in FIG. 11. The green light GLs2 exits out of the light source apparatus 20 via the position shifted in the directions −X and −Y and enters the plurality of lenses 411 disposed in the area A2 of the first multi-lens 41, which is the area shifted in the directions −X and −Y. Although not shown, the green light GLs2 enters the microlenses 621 via the first multi-lens 41, the second multi-lens 42, the superimposing lens 43, and the field lens 5, as the yellow light YLs in the first embodiment does. The green light GLs having entered each of the microlenses 621 is incident on the second subpixel SX2 of the pixel PX corresponding to the microlens 621.

Effects of Second Embodiment

The present embodiment also provides the same effects as those provided by the first embodiment, for example, a light source apparatus 20 capable of outputting a plurality of color luminous fluxes having an aligned polarization direction can be achieved without using a small-interval polarization converter, the light source apparatus 20 and the projector 1 can be reduced in size, and the first optical element 22 and the second optical element 23 that allow the dielectric multilayer films to be readily formed and have excellent light separation characteristics can be produced at low cost.

Furthermore, in the light source apparatus 20 according to the second embodiment, the green light GLs is outputted in place of the yellow light YLs in the light source apparatus 2 according to the first embodiment, whereby the amount of green light GLs incident on the pixels PX can be increased. The visual sensitivity of a projected image can thus be increased.

As the third color separator 35, a dichroic mirror characterized in that it reflects the green light GLs and transmits the red light RLs may be used, in contrast to the present embodiment. Depending on the yellow phosphor contained in the wavelength converter 28, the amount of red light contained in the yellow light YL emitted from the wavelength converter 28 is insufficient in some cases. In this case, using a dichroic mirror having the characteristics described above allows the red light to be incident on the second sub-pixel SX2 and the fourth sub-pixel SX4 out of the four sub-pixels SX1 to SX4. The color reproducibility of a projected image can thus be improved.

The technical scope of the present disclosure is not limited to the embodiments described above, and a variety of changes can be made thereto to the extent that the changes do not depart from the substance of the present disclosure.

For example, in the embodiments described above, the first optical layer 221 and the second optical layer 222 are provided at two surfaces of a single light-transmissive base. In place of the configuration described above, the first optical layer 221 and the second optical layer 222 may be provided at light-transmissive bases different from each other. For example, the first optical layer 221 may be provided at a first surface of a first light-transmissive base, an antireflection layer may be provided at a second surface of the first light-transmissive base that differs from the first surface, the second optical layer 222 may be provided at a third surface of a second light-transmissive base, an antireflection layer may be provided at a fourth surface of the second light-transmissive base that differs from the third surface, and the first optical layer 221 and the second optical layer 222 may be so disposed as to face each other. Similarly, the third optical layer 231 and the fourth optical layer 232 may be provided at light-transmissible bases different from each other.

The light source apparatus 2 according to the first embodiment and the light source apparatus 20 according to the second embodiment each include the first light collector 25 and the second light collector 27. The configuration described above is, however, not necessarily employed, and at least one of the first light collector 25 and the second light collector 27 may not be provided.

In each of the embodiments described above, the light source section 21 outputs the blue light BLs and BLp in the direction +X. The configuration described above is, however, not necessarily employed, and the light source section 21 may be configured to output the blue light BLs and BLp in a direction that intersects the direction +X, and the blue light BLs and BLp may be reflected, for example, off a reflection member and may then be incident on the first optical element 22 in the direction +X.

In each of the embodiments described above, the projector includes the homogenizer 4 including the first multi-lens 41, the second multi-lens 42, and the superimposing lens 43. In place of the configuration described above, a homogenizer having another configuration may be provided, or the homogenizer 4 may not be provided.

The light source apparatus 2 according to the first embodiment and the light source apparatus 20 according to the second embodiment described above each output color luminous fluxes via the four light exiting positions, and the liquid crystal panel 61, which forms the light modulator 6, has the four sub-pixels SX in each of the pixels PX. In place of the configuration described above, the light source apparatuses may each be configured to output three color luminous fluxes, and the liquid crystal panel may be configured to have three sub-pixels per pixel. In this case, for example, in each of the light source apparatuses according to the embodiments described above, a total reflection member may be provided in the optical path of the yellow light YLs.

The light source apparatus 2 according to the first embodiment outputs the blue light BLs, the yellow light YLs, the green light GLs, and the red light RLs, which are each S-polarized light and spatially separated from one another. The light source apparatus 20 according to the second embodiment outputs the blue light BLs, the green light GLs, and the red light RLs, which are each S-polarized light and spatially separated from one another. In place of the configurations described above, the color luminous fluxes outputted by each of the light source apparatuses may each have another polarization state. For example, the light source apparatuses may each be configured to output a plurality of spatially separated color luminous fluxes that are each P-polarized light. The color luminous fluxes outputted by the light source apparatuses are not limited to blue light, yellow light, green light, and red light and may be other color luminous fluxes. For example, the light source apparatuses may be configured to output white light in place of blue light and yellow light.

In addition to the above, the specific descriptions of the shape, the number, the arrangement, the material, and other factors of the components of the light source apparatus and the projector are not limited to those in the embodiments described above and can be changed as appropriate. The aforementioned embodiments have each been described with reference to the case where the light source apparatus according to the present disclosure is incorporated in a projector, but not necessarily. The light source apparatus according to any of the forms of the present disclosure may also be used as a lighting apparatus, a headlight of an automobile, and other components.

A light source apparatus according to an aspect of the present disclosure may have the configuration below.

The light source apparatus according to the aspect of the present disclosure includes a light source section that outputs first light having a first wavelength band and containing light polarized in a first polarization direction and light polarized in a second polarization direction different from the first polarization direction, a first optical layer that transmits in a first direction the first light polarized in the first polarization direction and reflects in a second direction that intersects the first direction the first light polarized in the second polarization direction, the first light incident from the light source section along the first direction, a second optical layer that is disposed in a position shifted in the first direction from the first optical layer and transmits in the first direction the first light polarized in the first polarization direction and incident from the first optical layer along the first direction, a third optical layer that is disposed in a position shifted in the first direction from the second optical layer and transmits in the first direction the first light polarized in the first polarization direction and incident from the second optical layer along the first direction, a fourth optical layer that is disposed in a position shifted in the first direction from the third optical layer and reflects in the second direction the first light polarized in the first polarization direction and incident from the third optical layer along the first direction, a diffusion element that is disposed in a position shifted in the second direction from the first optical layer, diffuses the first light incident from the first optical layer along the second direction, and outputs the diffused first light in a third direction opposite the second direction, and a wavelength converter that is disposed in a position shifted in the second direction from the third optical layer, converts in terms of wavelength the first light polarized in the first polarization direction and incident from the fourth optical layer along the second direction, and outputs in the third direction second light having a second wavelength band different from the first wavelength band. The third optical layer receives the second light from the wavelength converter along the third direction, transmits in the third direction the second light polarized in the first polarization direction, and reflects in a fourth direction opposite the first direction the second light polarized in the second polarization direction. The fourth optical layer receives the second light polarized in the first polarization direction and incident from the wavelength converter along the third direction and transmits in the third direction the second light polarized in the first polarization direction. The second optical layer receives the second light polarized in the second polarization direction and incident from the third optical layer along the fourth direction and reflects in the third direction the second light polarized in the second polarization direction. The first optical layer receives the first light outputted from the diffusion element along the third direction and transmits in the third direction the first light incident on the first optical layer. The second optical layer receives the first light that exits out of the first optical layer along the third direction and transmits in the third direction the first light incident on the second optical layer.

The light source apparatus according to the aspect of the present disclosure may further include a first retardation element which is provided between the first optical layer and the diffusion element and on which the first light polarized in the second polarization direction is incident along the second direction from the first optical layer.

In the light source apparatus according to the aspect of the present disclosure, the light source section may include a light emitter that outputs light having the first wavelength band and a second retardation element on which the light having the first wavelength band and outputted from the light emitter is incident and which outputs the first light containing light polarized in the first polarization direction and light polarized in the second polarization direction.

In the light source apparatus according to the aspect of the present disclosure, the second retardation element may be rotatable around an axis of rotation along the traveling direction of the light incident on the second retardation element.

The light source apparatus according to the aspect of the present disclosure may further include a first light-transmissive base disposed in a position shifted in the first direction from the light source section, and the first light-transmissive base may have a first surface facing the light source section and a second surface different from the first surface, with the first optical layer provided at the first surface and the second optical layer provided at the second surface.

The light source apparatus according to the aspect of the present disclosure may further include a second light-transmissive base disposed in a position shifted in the first direction from the first light-transmissive base, and the second light-transmissive base may have a third surface facing the first light-transmissive base and a fourth surface different from the third surface, with the third optical layer provided at the third surface and the fourth optical layer provided at the fourth surface.

The light source apparatus according to the aspect of the present disclosure may further include a first reflection member disposed in a position shifted in a fifth direction that interests the first direction and the second direction from the first light-transmissive base and the second light-transmissive base, a second reflection member disposed in a position shifted in a sixth direction opposite the fifth direction from the first light-transmissive base and the second light-transmissive base, and a third reflection member disposed in a position shifted in the first direction from the fourth optical layer.

In the light source apparatus according to the aspect of the present disclosure, the fourth optical layer may be a dichroic mirror that reflects the first light and transmits the second light.

In the light source apparatus according to the aspect of the present disclosure, the second optical layer may be a dichroic mirror that transmits the first light and reflects the second light.

The light source apparatus according to the aspect of the present disclosure may further include a first color separator that is disposed in a position shifted in the third direction from the second optical layer and separates the light that exits out of the second optical layer into third light having the first wavelength band and fourth light having the second wavelength band and a second color separator that is disposed in a position shifted in the third direction from the fourth optical layer and separates the light that exits out of the fourth optical layer into fifth light having a third wavelength band different from the second wavelength band and sixth light having a fourth wavelength band different from the second wavelength band and the third wavelength band.

A projector according to another aspect of the present disclosure may have the configuration below.

A projector according to the other aspect of the present disclosure includes the light source apparatus according to the aspect of the present disclosure, a light modulator that modulates light from the light source apparatus in accordance with image information, and a projection optical apparatus that projects the light modulated by the light modulator.

The projector according to the other aspect of the present disclosure may further include a homogenizer provided between the light source apparatus and the light modulator, and the homogenizer may include two multi-lenses that divide the light incident from the light source apparatus into a plurality of sub-luminous fluxes and a superimposing lens that superimposes the plurality of sub-luminous fluxes incident from the two multi-lenses on the light modulator.

In the projector according to the other aspect of the present disclosure, the light modulator may include a liquid crystal panel having a plurality of pixels and a microlens array provided on the light incident side of the liquid crystal panel and including a plurality of microlenses corresponding to the plurality of pixels. The plurality of pixels may each include a first sub-pixel, a second sub-pixel, a third sub-pixel, and a fourth sub-pixel. The microlenses may each cause the third light to be incident on the first sub-pixel, the fourth light to be incident on the second sub-pixel, the fifth light to be incident on the third sub-pixel, and the sixth light to be incident on the fourth sub-pixel.

What is claimed is:

1. A light source apparatus comprising:
    a light source section that outputs first light having a first wavelength band and containing light polarized in a first polarization direction and light polarized in a second polarization direction different from the first polarization direction;
    a first optical layer that transmits in a first direction the first light polarized in the first polarization direction and reflects in a second direction that intersects the first direction the first light polarized in the second polarization direction, the first light incident from the light source section along the first direction;
    a second optical layer that is disposed in a position shifted in the first direction from the first optical layer and transmits in the first direction the first light polarized in the first polarization direction and incident from the first optical layer along the first direction;
    a third optical layer that is disposed in a position shifted in the first direction from the second optical layer and transmits in the first direction the first light polarized in the first polarization direction and incident from the second optical layer along the first direction;
    a fourth optical layer that is disposed in a position shifted in the first direction from the third optical layer and reflects in the second direction the first light polarized in the first polarization direction and incident from the third optical layer along the first direction;
    a diffusion element that is disposed in a position shifted in the second direction from the first optical layer, diffuses the first light incident from the first optical layer along the second direction, and outputs the diffused first light in a third direction opposite the second direction; and
    a wavelength converter that is disposed in a position shifted in the second direction from the third optical layer, converts in terms of wavelength the first light polarized in the first polarization direction and incident from the fourth optical layer along the second direction, and outputs in the third direction second light having a second wavelength band different from the first wavelength band,
    wherein the third optical layer receives the second light from the wavelength converter along the third direction, transmits in the third direction the second light polarized in the first polarization direction, and reflects in a fourth direction opposite the first direction the second light polarized in the second polarization direction,
    the fourth optical layer receives the second light polarized in the first polarization direction and incident from the wavelength converter along the third direction and transmits in the third direction the second light polarized in the first polarization direction,
    the second optical layer receives the second light polarized in the second polarization direction and incident from the third optical layer along the fourth direction and reflects in the third direction the second light polarized in the second polarization direction,
    the first optical layer receives the first light outputted from the diffusion element along the third direction and transmits in the third direction the first light incident on the first optical layer, and
    the second optical layer receives the first light that exits out of the first optical layer along the third direction and transmits in the third direction the first light incident on the second optical layer.

2. The light source apparatus according to claim 1, further comprising
    a first retardation element which is provided between the first optical layer and the diffusion element and on which the first light polarized in the second polarization direction is incident along the second direction from the first optical layer.

3. The light source apparatus according to claim 1, wherein the light source section includes
a light emitter that outputs light having the first wavelength band, and
a second retardation element on which the light having the first wavelength band and outputted from the light emitter is incident and which outputs the first light containing light polarized in the first polarization direction and light polarized in the second polarization direction.

4. The light source apparatus according to claim 3, wherein the second retardation element is rotatable around an axis of rotation along a traveling direction of the light incident on the second retardation element.

5. The light source apparatus according to claim 1, further comprising
a first light-transmissive base disposed in a position shifted in the first direction from the light source section,
wherein the first light-transmissive base has a first surface facing the light source section and a second surface different from the first surface,
the first optical layer is provided at the first surface, and
the second optical layer is provided at the second surface.

6. The light source apparatus according to claim 5, further comprising
a second light-transmissive base disposed in a position shifted in the first direction from the first light-transmissive base,
wherein the second light-transmissive base has a third surface facing the first light-transmissive base and a fourth surface different from the third surface,
the third optical layer is provided at the third surface, and
the fourth optical layer is provided at the fourth surface.

7. The light source apparatus according to claim 6, further comprising:
a first reflection member disposed in a position shifted in a fifth direction that interests the first direction and the second direction from the first light-transmissive base and the second light-transmissive base;
a second reflection member disposed in a position shifted in a sixth direction opposite the fifth direction from the first light-transmissive base and the second light-transmissive base; and
a third reflection member disposed in a position shifted in the first direction from the fourth optical layer.

8. The light source apparatus according to claim 1, wherein the fourth optical layer is a dichroic mirror that reflects the first light and transmits the second light.

9. The light source apparatus according to claim 1, wherein the second optical layer is a dichroic mirror that transmits the first light and reflects the second light.

10. The light source apparatus according to claim 1, further comprising:
a first color separator that is disposed in a position shifted in the third direction from the second optical layer and separates the light that exits out of the second optical layer into third light having the first wavelength band and fourth light having the second wavelength band, and
a second color separator that is disposed in a position shifted in the third direction from the fourth optical layer and separates the light that exits out of the fourth optical layer into fifth light having a third wavelength band different from the second wavelength band and sixth light having a fourth wavelength band different from the second wavelength band and the third wavelength band.

11. A projector comprising:
the light source apparatus according to claim 10;
a light modulator that modulates light from the light source apparatus in accordance with image information; and
a projection optical apparatus that projects the light modulated by the light modulator.

12. The projector according to claim 11, further comprising
a homogenizer provided between the light source apparatus and the light modulator,
wherein the homogenizer includes
two multi-lenses that divide the light incident from the light source apparatus into a plurality of sub-luminous fluxes, and
a superimposing lens that superimposes the plurality of sub-luminous fluxes incident from the two multi-lenses on the light modulator.

13. The projector according to claim 12,
wherein the light modulator includes a liquid crystal panel having a plurality of pixels and a microlens array provided on a light incident side of the liquid crystal panel and including a plurality of microlenses corresponding to the plurality of pixels,
the plurality of pixels each include a first sub-pixel, a second sub-pixel, a third sub-pixel, and a fourth sub-pixel, and
the microlenses each cause
the third light to be incident on the first sub-pixel,
the fourth light to be incident on the second sub-pixel,
the fifth light to be incident on the third sub-pixel, and
the sixth light to be incident on the fourth sub-pixel.

* * * * *